(12) United States Patent
Wan et al.

(10) Patent No.: US 10,757,004 B2
(45) Date of Patent: Aug. 25, 2020

(54) ROUTING DOMAIN IDENTIFIER ASSIGNMENT IN LOGICAL NETWORK ENVIRONMENTS

(71) Applicant: Nicira, Inc., Palo Alto, CA (US)

(72) Inventors: Da Wan, Beijing (CN); Pankaj Thakkar, Palo Alto, CA (US); Anupam Chanda, Los Altos, CA (US); Jianjun Shen, Palo Alto, CA (US); Anuprem Chalvadi, Palo Alto, CA (US); Caixia Jiang, Beijing (CN); Hua Wang, Beijing (CN); Donghai Han, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 360 days.

(21) Appl. No.: 15/486,261

(22) Filed: Apr. 12, 2017

(65) Prior Publication Data

US 2018/0302314 A1  Oct. 18, 2018

(51) Int. Cl.
*G06F 15/173* (2006.01)
*H04L 12/751* (2013.01)
(Continued)

(52) U.S. Cl.
CPC .............. *H04L 45/02* (2013.01); *H04L 41/12* (2013.01); *H04L 45/44* (2013.01); *H04L 61/3025* (2013.01); *H04L 45/64* (2013.01)

(58) Field of Classification Search
CPC ............. H04L 12/4641; H04L 12/4666; H04L 12/467; H04L 41/0893; H04L 45/04;
(Continued)

(56) References Cited

U.S. PATENT DOCUMENTS 10,103,902 B1 * 10/2018 Sampath .............. H04L 12/467
10,243,846 B2    3/2019 Jiang et al.
(Continued)

OTHER PUBLICATIONS

International Search Report and Written Opinion of the International Searching Authority, International application No. PCT/US2018/027392, dated Jul. 4, 2018.
(Continued)

*Primary Examiner* — Dustin Nguyen
(74) *Attorney, Agent, or Firm* — Su IP Consulting

(57) ABSTRACT

Example methods are provided for assigning a routing domain identifier in a logical network environment that includes one or more logical distributed routers and one or more logical switches. In one example, the method may comprise obtaining network topology information specifying how the one or more logical distributed routers are connected with the one or more logical switches; and selecting, from the one or more logical switches, a particular logical switch for which routing domain identifier assignment is required. The method may also comprise: identifying a particular logical distributed router that is connected with the particular logical switch based on the network topology information; assigning the particular logical switch with the routing domain identifier that is associated with the particular logical distributed router; and using the routing domain identifier in a communication between a management entity and a host.

24 Claims, 15 Drawing Sheets

(51) Int. Cl.
*H04L 12/24* (2006.01)
*H04L 29/12* (2006.01)
*H04L 12/721* (2013.01)
*H04L 12/715* (2013.01)

(58) Field of Classification Search
CPC ....... H04L 45/74; H04L 12/66; H04L 45/586; H04L 47/72; H04L 63/0281; H04L 12/465; H04L 45/02; H04W 4/08
See application file for complete search history.

(56) References Cited

U.S. PATENT DOCUMENTS

| | | | |
|---|---|---|---|
| 2005/0152286 A1* | 7/2005 | Betts | H04L 45/02 370/255 |
| 2006/0034302 A1* | 2/2006 | Peterson | H04L 45/04 370/401 |
| 2009/0316702 A1* | 12/2009 | Knees | H04L 12/4641 370/395.3 |
| 2011/0142053 A1* | 6/2011 | Van Der Merwe | H04L 47/72 370/395.1 |
| 2013/0058346 A1 | 3/2013 | Sridharan et al. | |
| 2013/0223287 A1* | 8/2013 | Ahmad | H04L 12/465 370/255 |
| 2014/0075002 A1 | 3/2014 | Pradhan et al. | |
| 2014/0146817 A1* | 5/2014 | Zhang | H04L 45/74 370/392 |
| 2015/0009808 A1 | 1/2015 | Bejerano et al. | |
| 2015/0010001 A1* | 1/2015 | Duda | H04L 45/74 370/392 |
| 2015/0058968 A1* | 2/2015 | Wang | H04L 63/0281 726/12 |
| 2015/0063364 A1* | 3/2015 | Thakkar | H04L 12/66 370/401 |
| 2015/0117216 A1 | 4/2015 | Anand et al. | |
| 2015/0263946 A1* | 9/2015 | Tubaltsev | H04L 45/586 370/392 |
| 2015/0304117 A1* | 10/2015 | Dong | H04W 4/08 370/312 |
| 2016/0173338 A1 | 6/2016 | Wolting | |
| 2016/0285760 A1* | 9/2016 | Dong | H04L 12/4666 |
| 2017/0048129 A1 | 2/2017 | Masurekar et al. | |
| 2017/0358111 A1* | 12/2017 | Madsen | H04L 41/0893 |
| 2018/0069754 A1* | 3/2018 | Dasu | H04L 12/4641 |

OTHER PUBLICATIONS

Yingya Guo et al., "Traffic Engineering in SDN/OSPF Hybrid Network", IEEE 22nd International Conference on Network Protocols, 2014, pp. 563-568.

Xin Jin et al., "Dynamic Scheduling of Network Updates", SIGCOMM'14, Aug. 17-22, 2014, 12 pages, ACM.

\* cited by examiner

ROUTING DOMAIN IDENTIFIER ASSIGNMENT IN LOGICAL NETWORK ENVIRONMENTS

CROSS-REFERENCE TO RELATED APPLICATION

The present application U.S. patent application Ser. No. 15/486,261) is related in subject matter to U.S. patent application Ser. No. 15/595,917, filed on May 15, 2017, now U.S. Pat. No. 10,243,846, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines (VMs) in a Software-Defined Data Center (SDDC). For example, through server virtualization, VMs running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc.

Further, through network virtualization, benefits similar to server virtualization may be derived for networking services. For example, logical networks may be provisioned, changed, stored, deleted and restored programmatically without having to reconfigure the underlying physical hardware. Similar to a physical network, logical switches may be deployed to provide layer-2 switching services, and logical routers may to provide layer-3 routing services to facilitate east-west traffic within the SDDC and north-south traffic between the SDDC and an external network. In practice, it may be challenging to implement a logical network environment with various logical switches and logical routers in an efficient manner.

DETAILED DESCRIPTION

Figure 1:
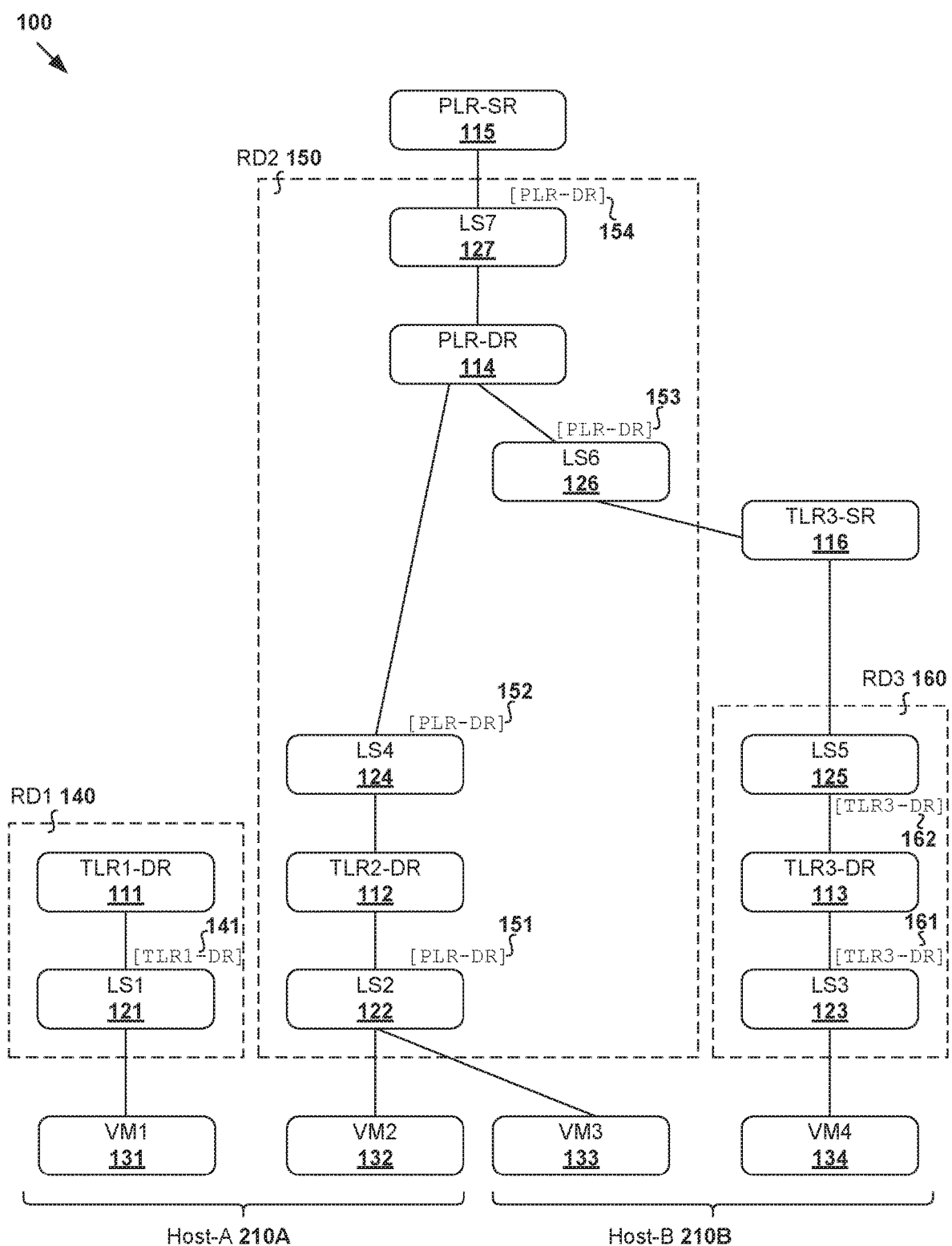
FIG. 1 is a schematic diagram illustrating a management plane view of an example logical network environment.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 2:
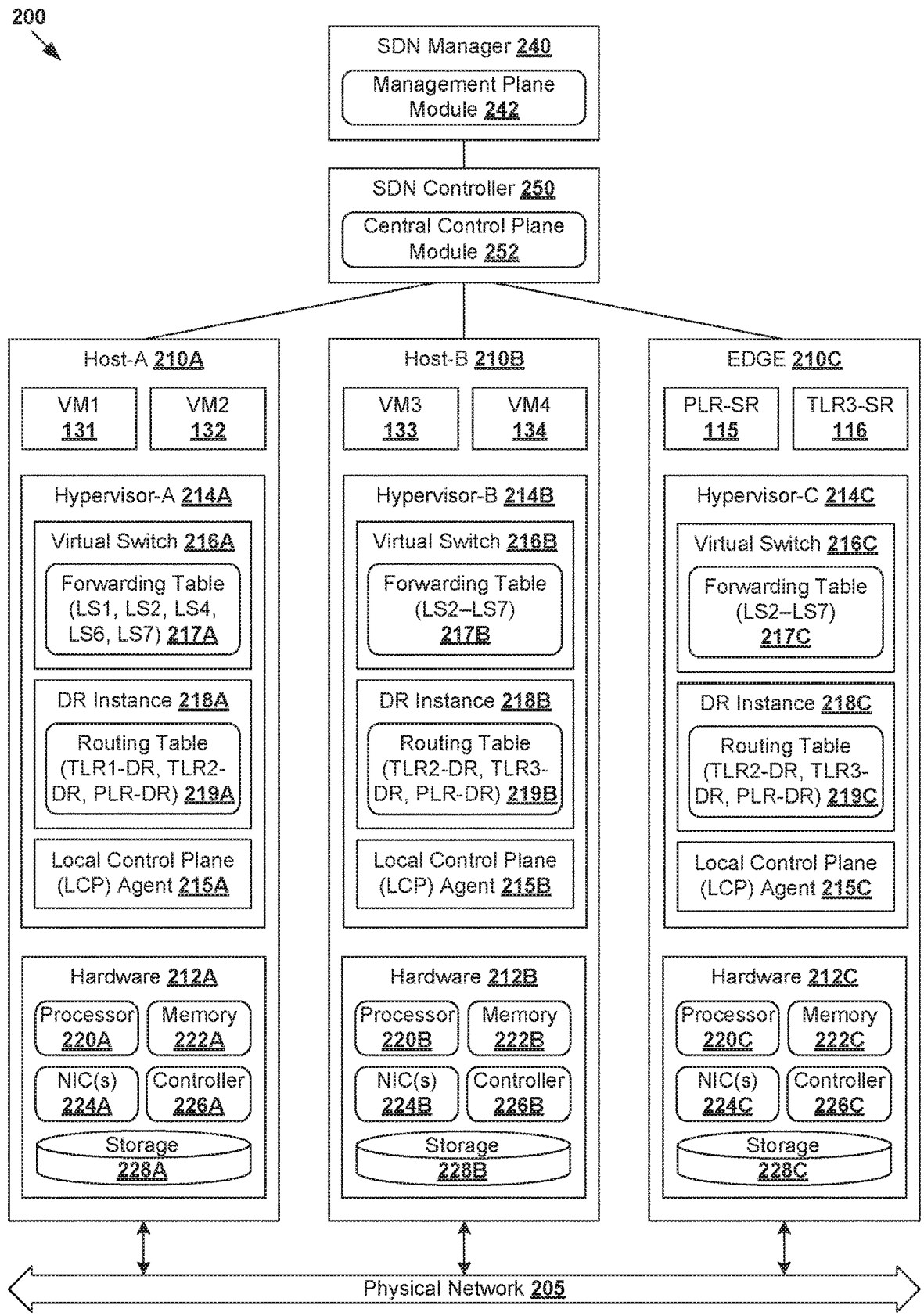
FIG. 2 is a schematic diagram illustrating a physical implementation view of the example logical network environment in FIG. 1.

Challenges relating to logical network environments will now be explained in more detail using FIG. 1 and FIG. 2, which represent two different views of the same logical network environment designed by a user (e.g., network administrator). FIG. 1 is a schematic diagram illustrating a management plane view of example logical network environment 100, and FIG. 2 is a schematic diagram illustrating physical implementation view 200 of example logical network environment 100 in FIG. 1. Depending on the desired implementation, logical network environment 100 may include additional and/or alternative component(s) than that shown in FIG. 1 and FIG. 2.

As will be explained further below, the management plane view in FIG. 1 represents how various components are defined internally, whereas the physical implementation view in FIG. 2 represents a physical realization of those components. In logical network environment 100, a logical router may be a logical distributed router (DR) or logical service router (SR). A DR is deployed to provide routing services for VM(s) and implemented in a distributed manner in that it may span multiple hosts that support those VM(s). An SR is deployed to provide centralized stateful services, such as firewall protection, load balancing, network address translation (NAT), etc. DR and SR are also known as "distributed" and "centralized" routing components, respectively.

In a data center with multiple tenants requiring isolation from each other, a multi-tier topology may be used. For example, a two-tier topology includes an upper tier associated with a provider logical router (PLR) and a lower tier associated with a tenant logical router (TLR). Each tier may include both DRs and SRs, or DRs and SRs on the upper tier but only DRs at the lower tier. The multi-tiered topology enables both the provider (e.g., data center owner) and tenant (e.g., data center tenant) to control their own services and policies. Each tenant has full control over its TLR policies, whereas common PLR policies may be applied to different tenants. As such, a logical router may be categorized as one of the following types: TLR-DR, TLR-SR, PLR-DR and PLR-SR.

Turning now to the example in FIG. 1, logical network environment 100 includes various examples of TLR-DR (see 111-113), TLR-SR (see 116), PLR-DR (see 114) and PLR-SR (see 115). TLR1-DR 111 (e.g., first tenant), TLR2-DR 112 (e.g., second tenant) and TLR3-DR 113 (e.g., third tenant) are deployed to provide first-hop, layer-3 routing services for respective virtual machines VM1 131, VM2 132, VM3 133 and VM4 134. Logical switches 121-123 provide first-hop, layer-2 switching services to the VMs. LS1 121 also connects TLR1-DR 111 with VM1 131, LS2 122 connects TLR2-DR 112 with VM2 132 and VM3 133, and LS3 123 connects TLR3-DR 113 with VM4 134. The term "layer-2" may refer generally to a Media Access Control (MAC) layer; and "layer-3" to a network or Internet Protocol (IP) layer in the Open System Interconnection (OSI) model, although the concepts described herein may be used with other networking models.

Logical switches 124-127 (known as transit logical switches) are configured to handle communications between two logical routers, and not directly connected to any virtual machine. In the example in FIG. 1, LS4 124 connects TLR2-DR 112 with PLR-DR 114; LS5 125 connects TLR3-DR 113 with TLR3-SR 116; LS6 126 connects TLR3-SR 116 with PLR-DR 114; and LS7 127 connects PLR-DR 114 with PLR-SR 115. A provider generally has full control over PLR-DR 114 and PLR-SR 115, while each tenant has full control over their own TLR-DR and/or TLR-SR.

Referring to physical implementation view 200 in FIG. 2, multiple hosts 210A-210C (also known as a "computing devices", "host computers", "host devices", "physical servers", "server systems", "physical machines" etc.) may be used to physically realize logical routers 111-115, logical switches 121-127 and virtual machines 131-134 in FIG. 1. For example, host-A 210A supports VM1 131 and VM2 132, host-B 210B supports VM3 133 and VM4 134, and edge 210C supports logical routers TLR3-SR 116 and PLR-SR 115. In this example, TLR3-SR 116 and PLR-SR 115 are implemented as virtual machines, but any other suitable approach (e.g., Linux-based datapath development kit (DPDK) packet processing software, etc.) may be used.

Logical switches 121-127 and DRs 111-114 are implemented in a distributed manner and can span multiple hosts. In particular, for a logical switch that is connected to a VM, the logical switch is "instantiated" on a host supporting the VM. Multiple logical switches may be instantiated using one virtual switch 216A/216B/216C (a physical switch implemented in software) at hypervisor 214A/214B/214C. Each instantiation of a logical switch is represented using an entry in forwarding table 217A/217B/217C maintained by virtual switch 216A/216B/216C. At host-A 210A in FIG. 2, forwarding table 217A includes entries associated with LS1 121, LS2 122, LS4 124, LS6 126 and LS7 127. At host-B 210B and edge 210C, forwarding table 217B/217C includes entries associated with logical switches 122-127.

Further, for a DR that is connected to a logical switch, the DR is also "instantiated" on each host on which the logical switch is instantiated. Multiple DRs may be instantiated using one logical DR instance 218A/218B/218C at hypervisor 214A/214B/214C. Each instantiation of a DR is represented using an entry in routing table 219A/219B/219C maintained by DR instance 218A/218B/218C. At host-A 210A in FIG. 2, routing table 219A includes entries associated with TLR1-DR 111, TLR2-DR 112 and PLR-DR 114. At host-B 210B and edge 210C, routing table 219B/219C includes entries associated with TLR2-DR 112, TLR3-DR 113 and PLR-DR 114.

Throughout the present disclosure, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system.

The term "hypervisor" may refer generally to a software layer or component that supports the execution of multiple virtualized computing instances, including system-level software that supports namespace containers such as Docker, etc. Hypervisor 214A/214B/214C maintains a mapping between underlying hardware 212A/212B/212C and virtual resources allocated to respective virtual machines. Hardware 212A/212B/212C includes suitable physical components, such as processor(s) 220A/220B/220C; memory 222A/222B/222C; physical network interface controller(s) or NIC(s) 224A/224B/224C; and storage disk(s) 228A/228B/228C accessible via storage controller(s) 226A/226B/226C, etc. Virtual resources are allocated to each virtual machine to support a guest operating system (OS) and application(s).

Logical switches, logical routers and logical networks may be configured (e.g., by a user) using management entities, such as SDN manager 240 residing on a management plane, SDN controller 250 residing on a central control plane, etc. Each management entity 240/250 may be implemented using physical machine(s), virtual machine(s), or both. One example of an SDN controller is the NSX controller component of VMware NSX® (available from VMware, Inc.), in which case the SDN manager may be an NSX manager component.

SDN controller 250 is responsible for collecting and disseminating control information relating to logical switches, logical routers, virtual machines, hosts and logical networks in logical network environment 100, such as network topology information, logical network membership information, protocol-to-hardware address (e.g., IP-to-MAC) mapping information of VMs, VTEP information, firewall rules and policies, etc. A logical network may be formed using any suitable protocol, such as Virtual eXtension Local Area Network (VXLAN), Stateless Transport Tunneling (STT), Generic Network Virtualization Encapsulation (GENEVE), etc. To facilitate communication among members of a particular logical network that reside on different hosts, hypervisor 214A/214B/214C implements a virtual tunnel endpoint (VTEP) to encapsulate and decapsulate packets with a tunnel header identifying the logical network.

The control information is required for various reasons, such as traffic forwarding from source=VM2 132 on host-A 210A to destination=VM4 134 on host-B 210B via PLR-DR 114. Since PLR-DR 114 is implemented in a distributed manner, if VM2 132 wants to send packets to VM4 134, the packets will have to be forwarded via TLR3-SR 116 on edge 210C in order to reach VM4 134 on host-B 210B. In this case, host-A 210A will need to know the VTEP information associated with LS6 126 on edge 210C to send packets to TLR3-SR 116. After edge 210C receives the packets from VM2 132 on host-A 210A, TLR3-SR 116 will send the packets to VM4 134 on host-B 210B. In this case, host-A 210A will have to report the VTEP information associated with LS1 121 and LS2 122. To receive the VTEP information associated with LS6 126 and LS7 127 (as reported by edge 210C), host-A 210A will also have to join a logical network associated with LS6 126 and LS7 127. Similarly, to receive the VTEP information associated with LS2 122 (as reported by host-B 210B), host-A 210A will have to join a logical network associated with LS2 122.

Further, hosts on which a DR is instantiated will need to know the VTEP information of all logical switches connecting that DR (also known as the DR's VTEPs). In one example, the VTEP information is required for address resolution purposes, such as using Address Resolution Protocol (ARP), neighbor discovery protocol (NDP), etc. Using ARP as an example, the destination needs to know the VTEP information of the source in order to send an ARP response with IP-to-MAC address mapping information of the destination. The VTEP information is also required for Gratuitous ARP (GARP) packet handling, where GARP packets are used to refresh a DR's ARP cache when a remote VM's IP-to-MAC address mapping information changes.

Conventionally, one approach for SDN controller 250 to collect the control information is to necessitate each host to send multiple report messages for multiple logical switches instantiated on the host. The control information reported by different hosts may then be summarized and redistributed to all hosts. In practice, however, the conventional approach may be inefficient and create a lot of resource burden on each host. For example, host-A 210A will have to send multiple report messages to report the VTEP information associated with LS1 121, LS2 122, LS6 126 and LS7 127, respectively. Similarly, host-B 210B will have to send multiple report messages to report the VTEP information associated with LS2 122, LS3 123, LS5 125, LS6 126 and LS7 127, and edge 210C also for LS2 122, LS3 123, LS5 125, LS6 126 and LS7 127. The VTEP information is required for inter-host packet transmission, such as packets from VM2 132 at host-A 210A to VM4 134 at host-B 210B. As additional DRs and associated logical switches are instantiated on host-A 210A, host-B 210B and edge 210C, more processing, memory and network resources will be required to generate and send additional report messages. This may in turn adversely affect the overall performance of the hosts and logical network environment 100.

Routing Domain Identifier Assignment

Figure 3:
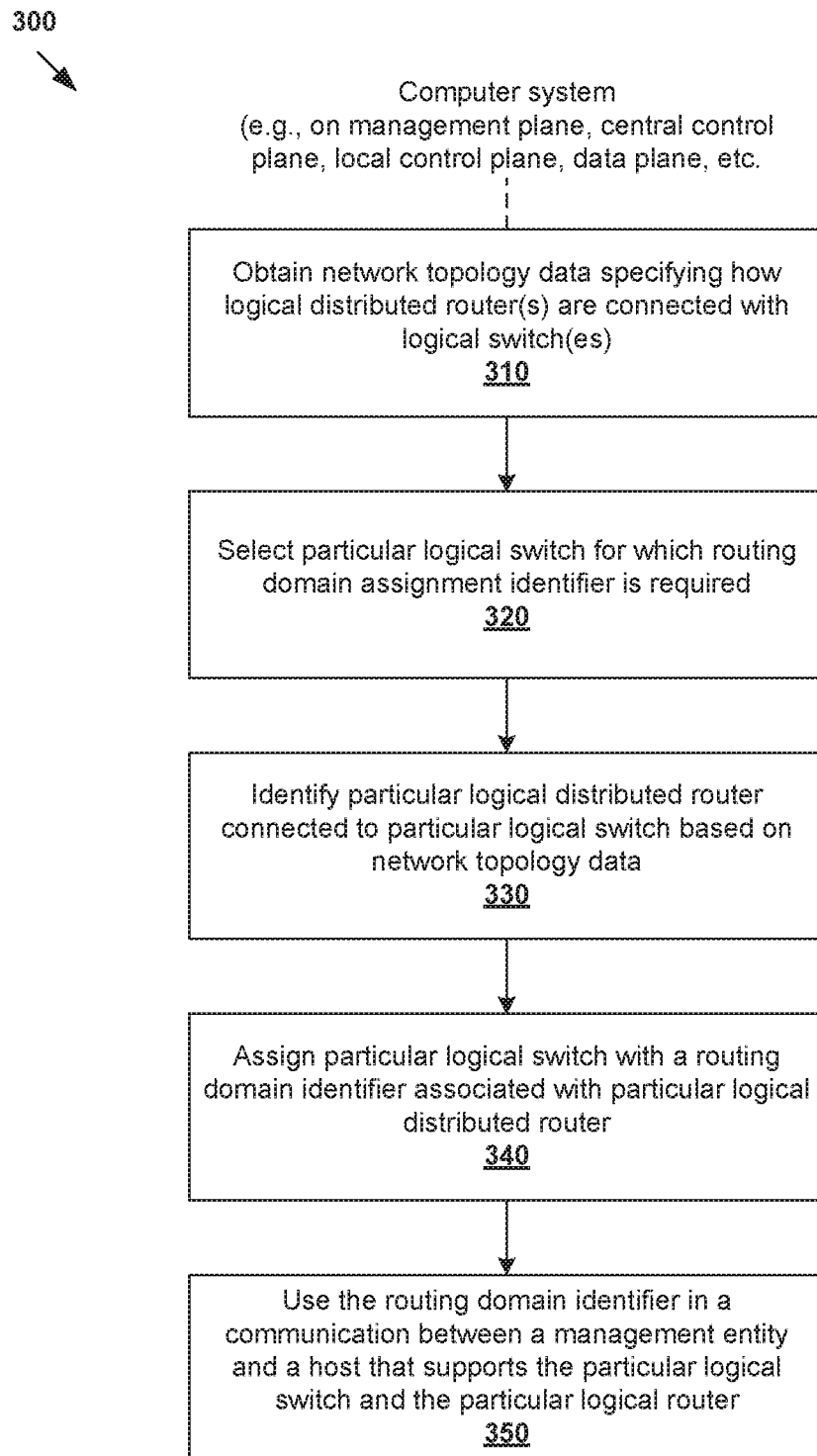
FIG. 3 is a flowchart of an example process to assign a routing domain identifier (ID) in a logical network environment.

According to examples of the present disclosure, routing domain identifier (ID) assignment may be performed to provide various improvements in logical network environment 100, including but not limited to the control information reporting scenario above. In more detail, FIG. 3 is a flowchart of example process 300 to assign a routing domain ID in logical network environment 100. Example process 300 may include one or more operations, functions, or actions illustrated by one or more blocks, such as 310 to 340. The various blocks may be combined into fewer blocks, divided into additional blocks, and/or eliminated depending on the desired implementation.

At 310 in FIG. 3, network topology information specifying how one or more logical distributed routers are connected with one or more logical switches in logical network environment 100 is obtained. Here, the term "obtaining" may refer generally to one entity retrieving or receiving information from another, such as SDN controller 250 retrieving the network topology information from SDN manager 240, host 210A/210B receiving the network topology information from SDN controller 250, etc. For example in FIG. 1 and FIG. 2, the network topology information may specify how logical switches 121-127 are connected to one or more of DRs 111-114.

At 320 in FIG. 3, a particular logical switch for which routing domain ID assignment is required is selected. At 330 in FIG. 3, a particular logical distributed router that is (either directly or indirectly) connected with the particular logical switch is identified based on the network topology information. At 340 in FIG. 3, the particular logical switch is assigned with a routing domain ID associated with the particular logical distributed router.

For example in FIG. 1 and FIG. 2, logical switches 121-127 may be assigned to one of three routing domains based on network topology information of logical network environment 100. In a first example, LS1 121 may be assigned to a first routing domain (see RD1 140) based on its connection with TLR1-DR 111. In a second example, LS2 122, LS4 124, LS6 126 and LS7 127 may be assigned to a second routing domain (see RD2 150) based on their connection with PLR-DR 114. Here, LS2 122 is indirectly connected to PLR-DR 114 on an upper tier via TLR2-DR 112 on a lower tier, whereas LS4 124, LS6 126 and LS7 127 are directly connected to PLR-DR 114. In a third example, LS3 123 and LS5 125 are assigned to a third routing domain (see "RD3" 160) based on their connection with TLR3-DR 113.

At 350 in FIG. 3, the routing domain ID is used in a communication between a management entity (e.g., SDN controller 250) and a host supporting the particular logical switch and the particular logical distributed router. In the control information reporting scenario discussed above, results of the assignment may be used to reduce the number of report messages sent by each host. Instead of necessitating each host to send a report message on a per-logical-switch basis according to the conventional approach, the report message may be sent on a per-routing-domain basis. For example, host-B 210B may generate and send a single report message for RD2 150 using routing domain ID= [PLR-DR]. SDN controller 250 may also communicate with host-B 210B using that ID. Compared to the conventional approach, the per-routing-domain approach improves efficiency and scalability.

From a logical layer perspective in FIG. 1, the scope of a routing domain may encompass logical switch(es) and associated DR(s). From a transport layer perspective in FIG. 2, a routing domain may span multiple hosts on which the logical switch(es) and DR(s) are instantiated. According to examples of the present disclosure, routing domain ID assignment may be performed by any suitable computer system configured to implement a management plane (e.g., management plane module 242 at SDN manager 240), central control plane (e.g., central control plane module 252 at SDN controller 250), local control plane (e.g., local control plane agent 215A/215B/215C at host 210A/210B/210C), data plane (e.g., a kernel module at host 210A/210B/210C, not shown for simplicity), etc.

Since routing domains may be assigned by the management plane, central control plane, local control plane or data plane, examples of the present disclosure may be implemented to provide consistent results for the same network topology, regardless of where the assignment is performed. For example, in first routing domain 140 in FIG. 1, LS1 121 is assigned with ID=[TLR1-DR] associated with TLR1-DR 111 (see 141). In second routing domain 150, LS2 122, LS4 124, LS6 126 and LS7 127 are assigned with ID=[PLR-DR] associated with PLR-DR 114 (see 151, 152, 153, 154). In third routing domain 160, LS3 123 and LS5 125 are assigned with ID=[TLR3-DR] associated with TLR3-DR 113 (see 161, 162). This way, the routing domain ID assigned to each logical switch will be consistent and unique across logical network environment 100. Various examples will be explained using FIG. 4 to FIG. 15 below.

Detailed Process

Figure 4:
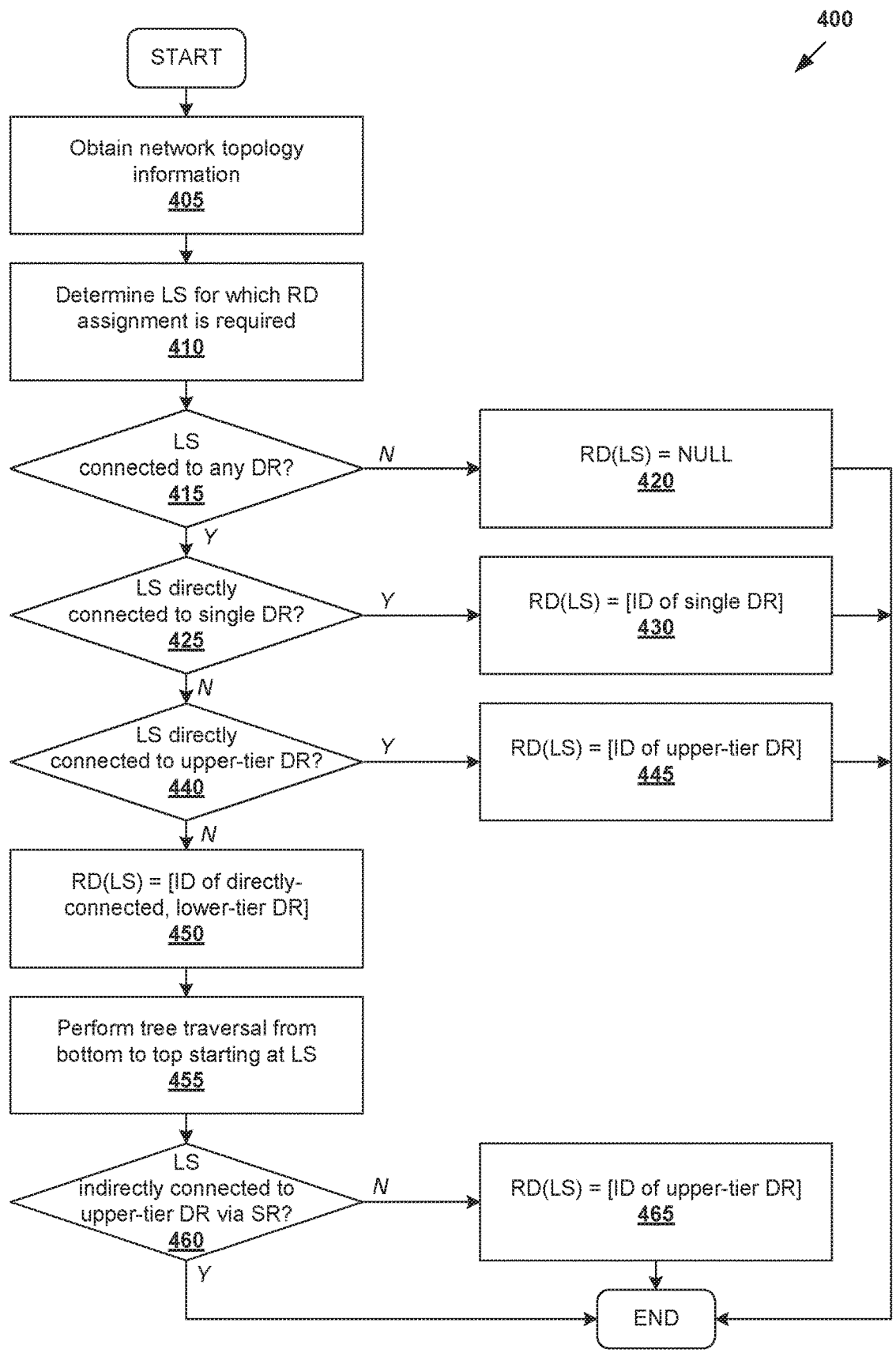
FIG. 4 is a flowchart of an example detailed process to assign a routing domain ID in a logical network environment.

FIG. 4 is a flowchart of example detailed process 400 to assign a routing domain ID in a logical network environment. Example process 400 may include one or more operations, functions, or actions illustrated by one or more blocks, such as 405 to 465. The various blocks may be combined into fewer blocks, divided into additional blocks, and/or eliminated depending on the desired implementation. Similar to the example in FIG. 3, example process 400 may be implemented by the management plane, central control plane, local control plane, data plane, etc.

At 405 and 410 in FIG. 4, network topology information associated with a logical network environment is obtained, and a logical switch for which routing domain ID assignment or computation is required is determined. To assign a routing domain to the logical switch, the following rules may be applied. Various examples will also be discussed using FIG. 5A and FIG. 5B (single DR), FIG. 6A and FIG. 6B (single DR and single SR), FIG. 7A and FIG. 7B (multiple DRs), and FIG. 8 (multiple DRs and multiple SRs).

According to a first rule, a logical switch that is not connected to any DR has its own routing domain. In this case, the logical switch is assigned with routing domain ID (i.e., "RD(LS)") with a NULL value according to blocks 415 and 420 in FIG. 4.

According to a second rule, a logical switch that is connected to a single DR (TLR or PLR) is assigned with the routing domain associated with that DR. In this case, the routing domain ID of that DR is assigned to the logical switch according to blocks 425 and 430 in FIG. 4.

According to a third rule, a lower-tier DR (e.g., a TLR) that is connected to an upper-tier DR (e.g., a PLR) is part of the routing domain of the upper-tier DR. In one example, in response to determination that a logical switch and an upper-tier DR are directly connected with each other, the logical switch is takes on the routing domain ID of the upper-tier DR according to blocks 440 and 445 in FIG. 4. In another example, in response to determination that a logical switch is indirectly connected to the upper-tier DR via the lower-tier DR, the logical switch is given the routing domain ID of the upper-tier DR according to blocks 440, 450, 455, 460 and 465 in FIG. 4.

According to a fourth rule, a DR linked to an SR has its own routing domain. In this case, in response to determination that a logical switch is directly connected with a lower-tier DR, and indirectly connected to an upper-tier DR via the SR, the logical switch is assigned the routing domain ID of the lower-tier DR according to blocks 440, 450, 455 and 460 (yes case) in FIG. 4.

(a) Example 1: Single DR

Figure 5A:
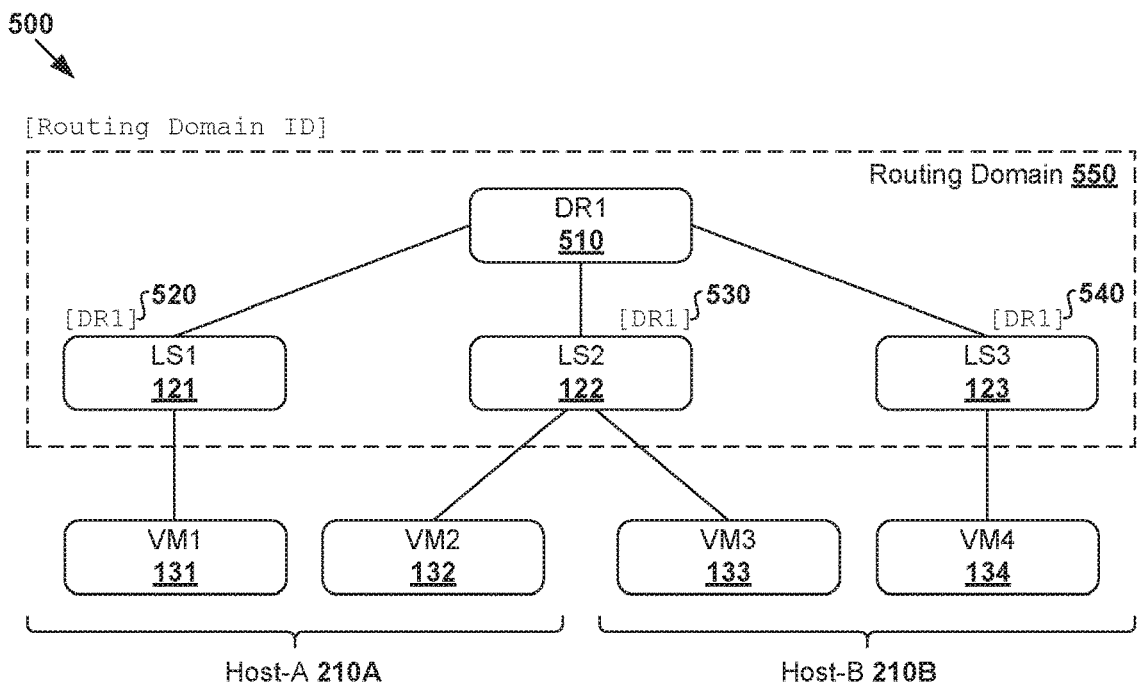
FIG. 5A is a schematic diagram illustrating example routing domain ID assignment in a logical network environment with a single logical distributed router (DR) according to the example in FIG. 4.
Figure 5B:
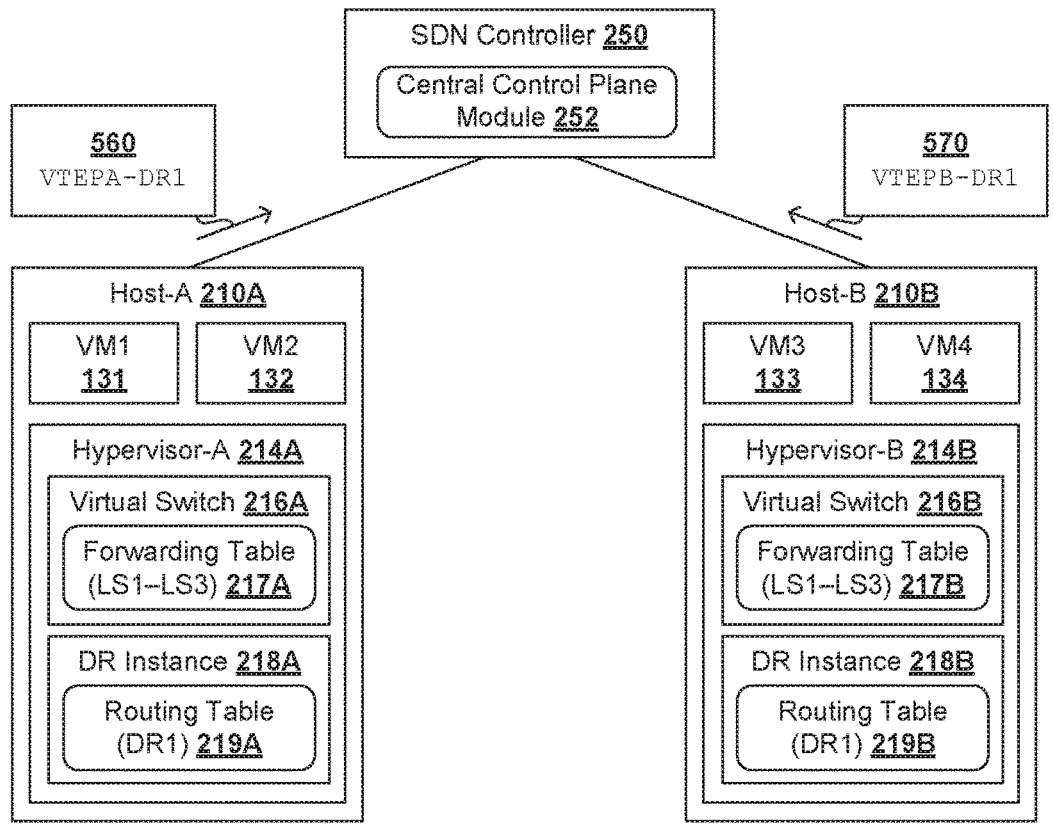
FIG. 5B is a schematic diagram illustrating a physical implementation view of the logical network environment in FIG. 5A.

A first example will be explained using FIG. 5A and FIG. 5B. FIG. 5A is a schematic diagram illustrating example routing domain ID assignment in logical network environment 500 with a single DR according to the example in FIG. 4. FIG. 5B is a schematic diagram illustrating a physical implementation view of logical network environment 500 in FIG. 5A.

Referring first to FIG. 5A, the tree-like structure of logical network environment 500 facilitates communication among VMs 131-134 via DR1 510. VM1 131 is connected to DR1 510 via LS1 121, VM2 132 and VM3 133 via common LS2 122, and VM4 134 via LS3 123. For example, packets from VM1 131 on host-A 210A to VM4 134 on host-B 210B may be forwarded via LS1 121, DR1 510 and LS3 123. Using the assignment process in FIG. 4, it is determined that LS1 121 is directly connected with a single DR (i.e., DR1 510). In this case, LS1 121 is assigned with routing domain ID=[DR1], which is a unique ID of DR1 510. See corresponding blocks 405, 415, 425 and 430 in FIG. 4.

The same may be repeated for LS2 122 and LS3 123. Since they are also directly connected to DR1 510, LS2 122 and LS3 123 with routing domain ID=[DR1]. The naming convention based on the ID of DR1 510 is one way to obtain consistent assignment results, regardless of where the assignment is performed. From a logical layer perspective in FIG. 5A, the scope of routing domain [DR1] (see 550) encompasses DR1 510, LS1 121 (see 520), LS2 122 (see 530), and LS3 123 (see 540). From a transport layer perspective in FIG. 5B, routing domain with ID=[DR1] spans both host-A 210A and host-B 210B, with logical switches 121-123 and DR1 510 on instantiated on both host-A 210A and host-B 210B. See also forwarding table 217A/217B and routing table 219A/219B in FIG. 5B.

Figure 6A:
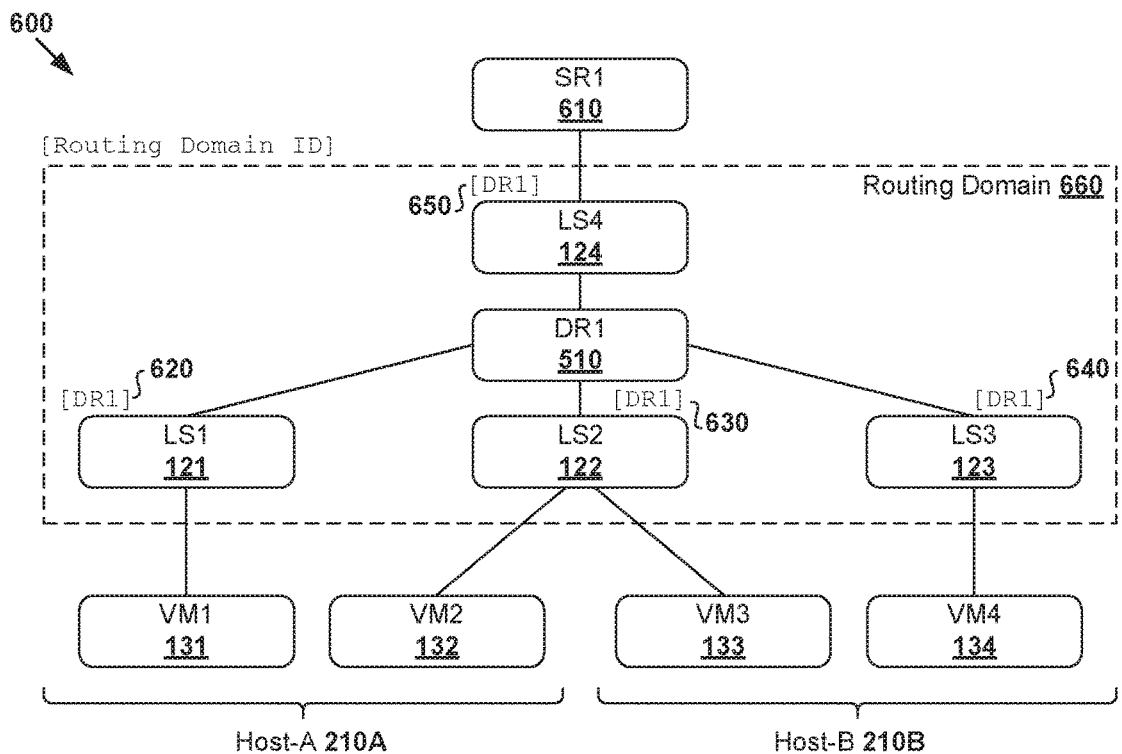
FIG. 6A is a schematic diagram illustrating example routing domain ID assignment in a logical network environment with a single DR and a single service router (SR) according to the example in FIG. 4.
Figure 6B:
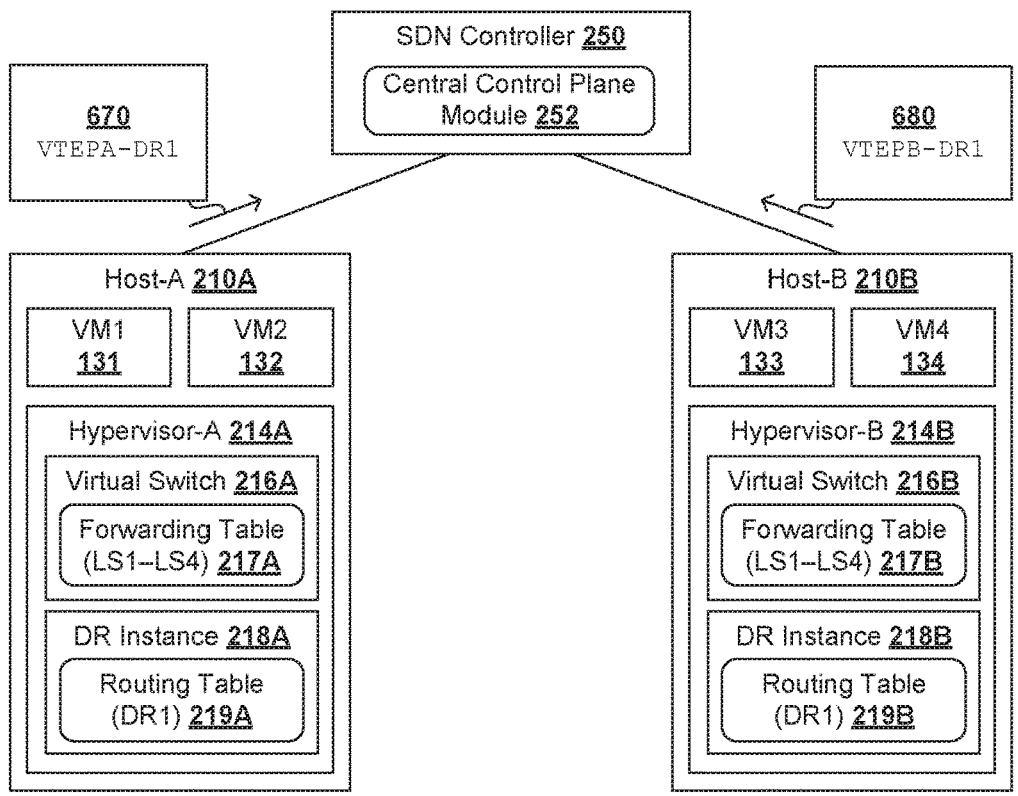
FIG. 6B is a schematic diagram illustrating a physical implementation view of the logical network environment in FIG. 6A.

In the example in FIG. 5B, SDN controller 250 may perform the assignment, and configure routing domain ID=[DR1] on host-A 210A and host-B 210B. When reporting control information such as VTEP information of logical switches 121-123, a single report message associated with routing domain ID=[DR1] may be generated and sent to SDN controller 250, such as messages labelled "VTEPA-DR1" 560 from host-A 210A, and "VTEPB-DR1" 570 from host-B 210B (b) Example 2: Single DR and Single SR A second example will be explained using FIG. 6A and FIG. 6B. FIG. 6A is a schematic diagram illustrating example routing domain ID assignment in logical network environment 600 with one DR and one SR according to the example in FIG. 4. FIG. 6B is a schematic diagram illustrating a physical implementation view of logical network environment 600 in FIG. 6B.

Compared to the example in FIG. 5A, logical network environment 600 also has a single DR1 510 that is connected with logical switches LS1 121, LS2 122 and LS3 123. Similarly, LS1 121, LS2 122 and LS3 123 are assigned with routing domain ID=[DR1]. Additionally, logical network environment 600 includes service router SR1 610, and transit logical switch LS4 124 that connects SR1 610 with DR1 510. Since LS4 124 is also connected to a single DR, LS4 124 is also assigned with routing domain ID=[DR1]. See corresponding blocks 405, 415, 425 and 430 in FIG. 4.

From a logical layer perspective in FIG. 6A, the scope of routing domain [DR1] (see 660) encompasses DR1 510, LS1 121 (see 620), LS2 122 (see 630), LS3 123 (see 640) and LS4 124 (see 650). It should be noted that the scope of routing domain [DR1] does not include SR1 610. From a transport layer perspective in FIG. 6B, routing domain [DR1] spans both host-A 210A and host-B 210B (edge 210C supporting SR1 610 is not shown for simplicity). The physical implementation of logical switches 121-124 and DR1 510 requires their instantiation on both host-A 210A and host-B 210B. See also forwarding table 217A/217B and routing table 219A/219B in FIG. 6B.

In the example in FIG. 6B, SDN controller 250 may perform the assignment, and configure routing domain ID=[DR1] on host-A 210A and host-B 210B. When reporting control information such as VTEP information of logical switches 121-124, a single report message associated with routing domain ID=[DR1] may be generated and sent to SDN controller 250, such as messages labelled "VTEPA-DR1" 670 from host-A 210A, and "VTEPB-DR1" 680 from host-B 210B. Although not shown, a host implementing SR1 610 also sends a report message associated with [DR1] to SDN controller 250.

(c) Example 3: Multiple DRs

Figure 7A:
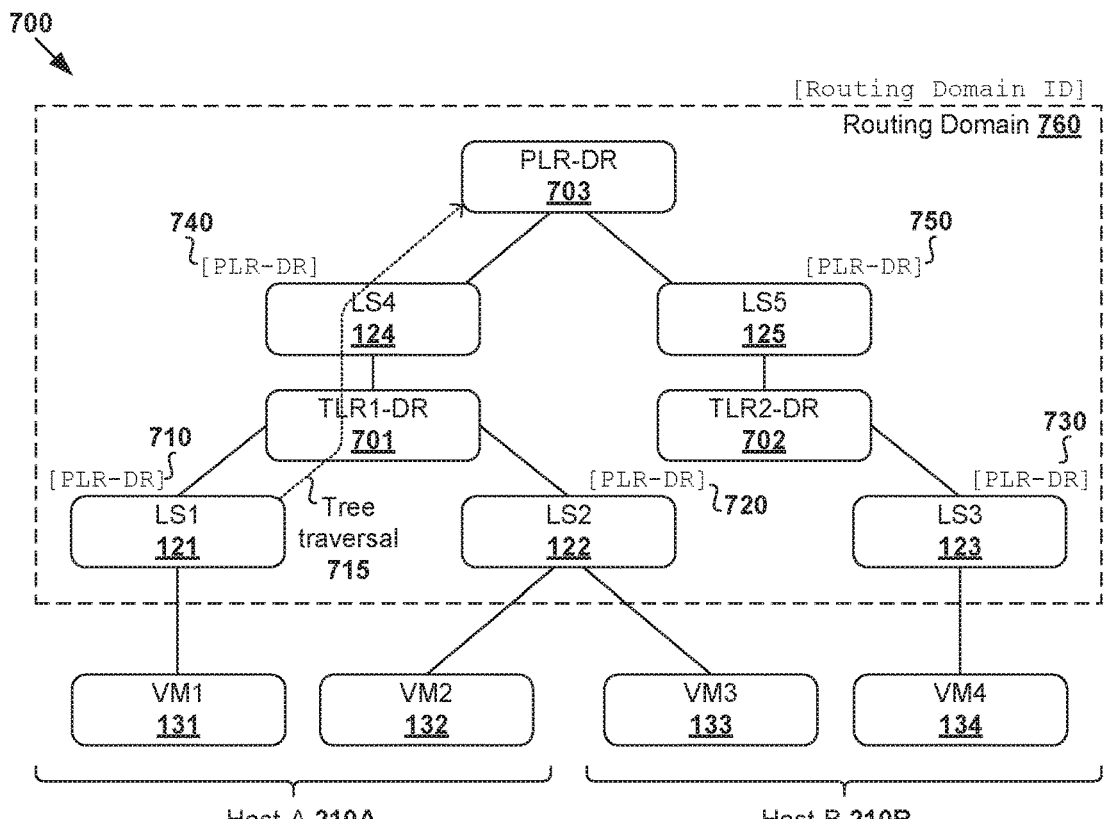
FIG. 7A is a schematic diagram illustrating example routing domain ID assignment in a logical network environment with multiple DRs according to the example in FIG. 4.
Figure 7B:
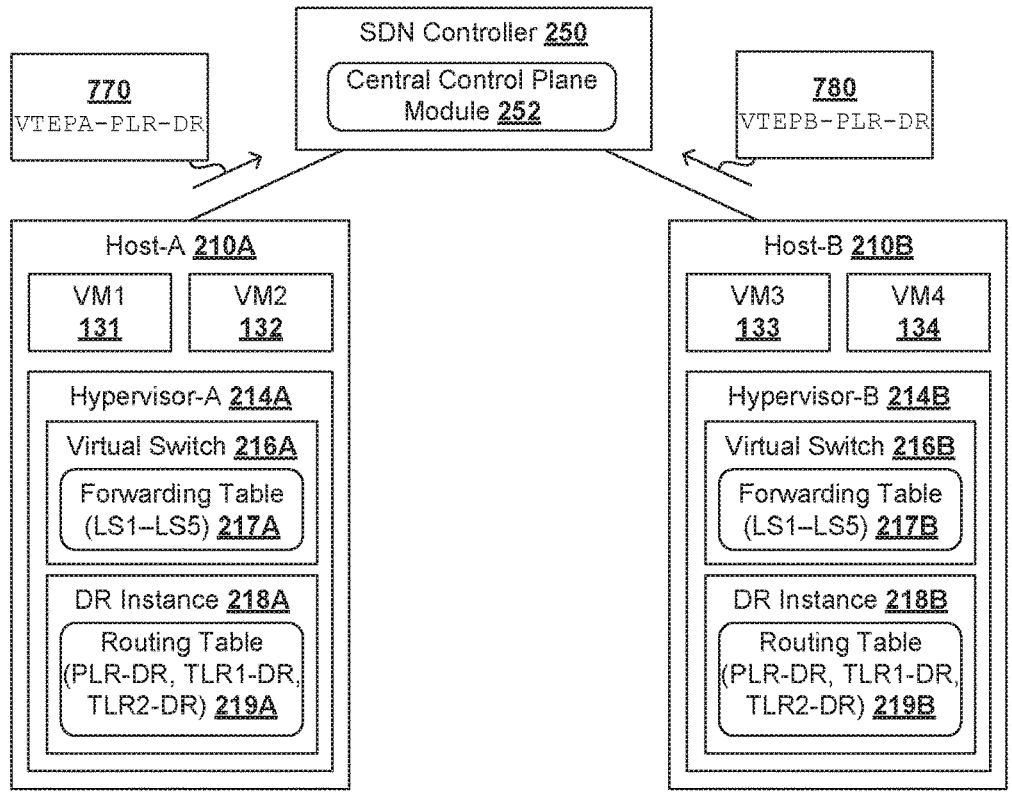
FIG. 7B is a schematic diagram illustrating a physical implementation view of the logical network environment in FIG. 7A.

A third example will be explained using FIG. 7A and FIG. 7B. FIG. 7A is a schematic diagram illustrating example routing domain ID assignment in logical network environment 700 with multiple DRs according to the example in FIG. 4. FIG. 7B is a schematic diagram illustrating a physical implementation view of logical network environment 700 in FIG. 7B.

In the example in FIG. 7A, multiple DRs are connected with each other (without any SR in between). Logical network environment 700 includes three DRs (i.e., TLR1-DR 701, TLR2-DR 702 and PLR-DR 703) that are each connected to one or more of logical switches 121-125. At a lower tier, TR1-DR 701 (e.g., first tenant) is connected to both LS1 121 and LS2 122, while TLR2-DR 702 (e.g., second tenant) is connected to LS3 123. At a upper tier, PLR-DR 703 is connected to TLR1-DR 701 and TLR2-DR 702 via transit logical switches LS4 124 and LS5 125, respectively.

Unlike the examples in FIG. 5A and FIG. 5B, each logical switch in FIG. 7A is connected to one DR on a lower tier (TLR1-DR 701 or TLR2-DR 703), and another DR on an upper tier (PLR-DR 703). According to blocks 440 and 445 in FIG. 4, LS4 124 and LS5 125 are determined to be directly connected with upper-tier PLR-DR 703, and assigned with routing domain ID=[PLR-DR], which is a unique ID of PLR-DR 703.

In the case of LS1 121, LS2 122 and LS3 123, they are not directly connected with upper-tier PLR-DR 703. According to blocks 440 and 450 in FIG. 4, LS1 121 is initially assigned with routing domain ID=[TLR1-DR], which is a unique ID of lower-tier TLR1-DR 701 that is directly connected to LS1 121. According to blocks 455, 460 and 465 in FIG. 4, a bottom-to-top tree traversal is performed to search for an indirect connection between LS1 121 and PLR-DR 703. As shown at 715 in FIG. 7A, starting at LS1 121, the tree traversal is performed to determine that LS1 121 is indirectly connected to PLR-DR 703 via TLR1-DR 701 and LS4 124. As such, the routing domain ID assigned to LS1 121 is updated from [TLR1-DR] to [PLR-DR].

The above is repeated for LS2 122 and LS3 123. Similarly, since LS2 122 is directly connected to TLR1-DR 701 and indirectly connected to PLR-DR 703, its routing domain ID is initially set to [TLR1-DR] before being updated to [PLR-DR] after a tree traversal. Further, since LS3 123 is directly connected to TLR2-DR 702 and indirectly connected to PLR-DR 703, its routing domain ID is initially set to [TLR2-DR] before being updated to [PLR-DR]. Since there are multiple DRs in the example FIG. 7A, the ID of upper-tier PLR-DR 703 is used as the routing domain ID instead of that of TLR1-DR 701 or TLR2-DR 702. Again, this naming convention ensures the uniqueness of the routing domain ID, regardless of who performs the assignment.

From a logical layer perspective in FIG. 7A, the scope of routing domain [DR1] (see 760) encompasses PLR-DR 703, TLR1-DR 701, TLR2-DR 702, LS1 121 (see 710), LS2 122 (see 720), LS3 123 (see 730), LS4 124 (see 740) and LS5 125 (see 750). From a transport layer perspective in FIG. 7B, routing domain [DR1] spans both host-A 210A and host-B 210B. The physical implementation in FIG. 7B requires the instantiation of logical switches 121-125, PLR-DR 703, TLR1-DR 701 and TLR2-DR 702 on both host-A 210A and host-B 210B. See also forwarding table 217A/217B and routing table 219A/219B in FIG. 7B.

In the example in FIG. 7B, SDN controller 250 may perform the assignment, and configure routing domain ID=[PLR-DR] on host-A 210A and host-B 210B. When reporting control information such as VTEP information of logical switches 121-123, a single report message associated with routing domain ID=[DR1] may be generated and sent to SDN controller 250. For example, message labelled "VTEPA-PLR-DR" 770 is from host-A 210A, and "VTEPB-PLR-DR" 780 is from host-B 210B.

(d) Example 4: Multiple DRs and Multiple SRs

Figure 8:
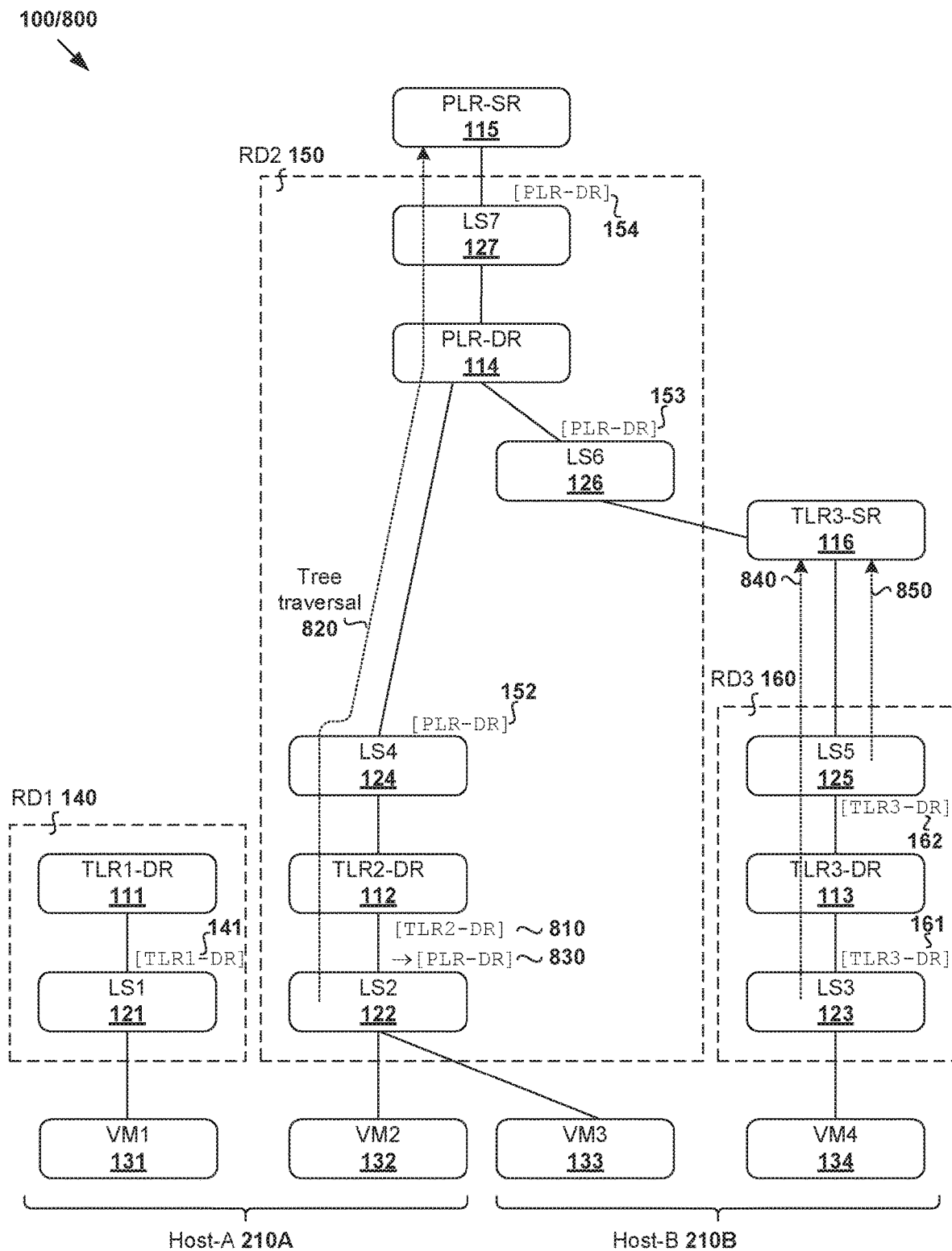
FIG. 8 is a schematic diagram illustrating example routing domain ID assignment in the logical network environment with multiple DRs and SRs in FIG. 1 according to the example in FIG. 4.

The example in FIG. 1 will be explained in more detail using FIG. 8, which is a schematic diagram illustrating an example routing domain ID assignment in logical network environment 100/800 with multiple DRs and multiple SRs in FIG. 1 according to the example in FIG. 4. Compared to the examples in FIG. 5A to FIG. 7B, logical network environment 100 represents a more complex topology with multiple tenants in a production environment. Three routing domains are identified as follows.

The scope of first routing domain 140 encompasses TLR1-DR 111 and LS1 121. According to blocks 425 and 430 in FIG. 4, LS1 121 is assigned with routing domain ID=[TLR1-DR] because it is directly connected to a single DR=TLR1-DR 111. See corresponding 141 in FIG. 8.

The scope of second routing domain 150 encompasses LS2 122, TLR2-DR 112, LS4 124, LS6 126, PLR-DR 114 and LS7 127. According to blocks 440 and 445 in FIG. 4, LS4 124, LS6 126 and LS7 127 are each assigned with routing domain ID=[PLR-DR] because they are directly connected to upper-tier PLR-DR 114. See corresponding 151-154 in FIG. 8.

In the case of LS2 122, however, tree traversal is required. According to blocks 450, 455, 460 and 465, LS2 122 is assigned with routing domain ID=[TLR2-DR] (see 810 in FIG. 8) before performing a bottom-to-top tree traversal (see 820 in FIG. 8). Starting at LS2 122, the purpose of the tree traversal is to search for an indirect connection between LS2 122 and an upper-tier DR, in this case PLR-DR 114. Since the indirect connection via TLR2-DR 112 and LS4 124 is found, the routing domain ID of LS2 122 is updated from [TLR2-DR] to [PLR-DR] (see 830 in FIG. 8).

The scope of third routing domain 160 encompasses LS5 125, TLR3-DR 113 and LS3 123. According to blocks 440 and 450 in FIG. 4, it is determined that LS3 123 and LS5 125 are directly connected with lower-tier TLR3-DR 113 and assigned with routing domain ID=[TLR3-DR]. According to blocks 455 and 460 in FIG. 4, a bottom-to-top tree traversal is performed (see 830 in FIG. 8) to determine that LS3 123 is indirectly connected to upper-tier PLR-DR 114 via TLR3-SR 116. Since a routing domain does not encompass any SR, the tree traversal stops at TLR3-SR 116. As such, the routing domain ID=[TLR3-DR] of LS3 123 is unchanged. The same applies to LS5 125; see traversal starting from LS5 125 at 850 in FIG. 8. See corresponding 161-162 in FIG. 8.

Referring to the physical implementation view in FIG. 2 again, SDN controller 250 may perform the assignment, and configure routing domains [TLR1-DR] and [PLR-DR] on host-A 210A, as well as [PLR-DR] and [TLR3-DR] host-B 210B and edge 210C. When reporting control information such as VTEP information of logical switches, host-A 210A may generate and send two report messages for respective [TLR1-DR] and [PLR-DR], while host-B 210B may generate and send two report messages for respective [TLR3-DR] and [PLR-DR]. Based on the assignment, it is not necessary for each host to generate a report message for each and every logical switch instantiated on that host.

Routing Domain ID Update

According to examples of the present disclosure, the routing domain ID of a logical switch may be updated based on network topological changes. In practice, the change may be caused by operations such as create, delete and update, etc. The operations may be performed on any logical object in a logical network environment. Here, the term "logical object" may generally to a logical switch, logical switch port, logical router (TLR-DR, TLR-SR, PLR-DR or PLR-SR), logical router port, etc.

Figure 9:
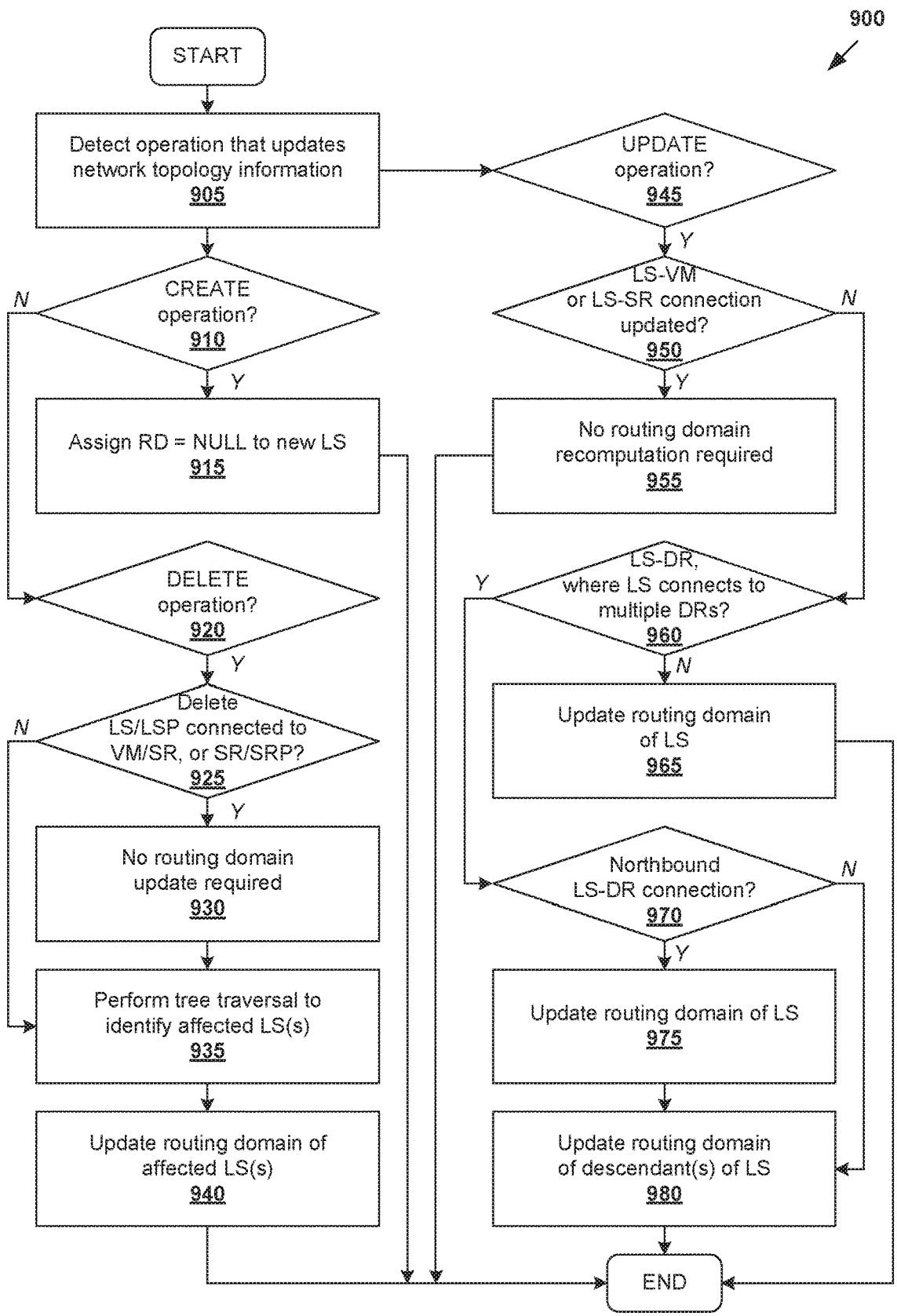
FIG. 9 is a flowchart of an example detailed process to update a routing domain ID in a logical network environment.

In more detail, FIG. 9 is a flowchart of example detailed process 900 to update a routing domain ID in a logical network environment. Example process 900 may include one or more operations, functions, or actions illustrated by one or more blocks, such as 905 to 980. The various blocks may be combined into fewer blocks, divided into additional blocks, and/or eliminated depending on the desired implementation. Example process 900 may be implemented by the management plane, central control plane, local control plane, data plane, etc.

According to example process 900 in FIG. 9, in response detecting an operation that updates the network topology information, it is determined whether the operation affects a particular logical switch, or descendant(s) associated with the particular logical switch, or both. If the determination in response to determination in the affirmative, the routing domain ID of the particular logical switch, or the routing domain of the descendant(s), or both, will be updated.

Since the assignment process in FIG. 4 may be relatively resource-intensive (especially for complex network topology with many logical switches and logical routers), one approach is to identify logical switches that are affected by a particular operation. If necessary, the routing domain ID of the affected logical switches will be updated, while others remain unchanged. This approach is more efficient compared to repeating the assignment process for all logical switches in the logical network environment. The example in FIG. 9 will be explained using FIG. 10, which is a schematic diagram illustrating first example create and delete operations in logical network environment 100.

(a) Create Operations

According to blocks 905, 910 and 915 in FIG. 9, in response to detecting an operation to create a logical switch, its routing domain ID may be initially set to a default value (e.g., empty ID=NULL). In the example in FIG. 10, LS8 128 is a newly created logical switch and initially assigned with routing domain ID=NULL (see 1010). Unless LS8 128 is connected to another logical switch, DR or SR, there will be no logical switch affected by the create operation.

(b) Delete Operations

The deletion of a logical object may or may not result in routing domain changes. According to blocks 905, 920 and 925 in FIG. 9, in response to detecting a delete operation to delete a logical object, it is determined whether a routing domain ID update is required. In particular, the determination at 925 may be based on the type of the deleted logical object, such as logical switch, DR, SR, a logical switch port, a DR port, an SR port, etc.

According to some examples, a particular logical switch will not be affected by an operation to delete one of the following logical objects: another logical switch or a logical switch port that is directly connected to a VM; another logical switch or a logical switch port that is directly connected to an SR; an SR and a port on the SR. On the other hand, if a particular logical switch (e.g., LS4 124) is assigned with a routing domain associated with a particular DR (e.g., PLR-DR 114), particular logical switch will be affected if the particular DR is deleted. Several scenarios are discussed below using FIG. 10 and FIG. 11. The first three scenarios (D1, D2 and D3, "D" for deleted) are described below using FIG. 10. Two other scenarios (D4 and D5) will be explained using FIG. 11, which is a schematic diagram illustrating second example delete operations in a logical network environment.

Scenario D1 (see blocks 925 and 930 in FIG. 9): No routing domain ID update is performed when the deleted logical object type=logical switch that is directly connected with a VM. For example in FIG. 10, LS1 121 is directly connected with VM1 131, LS2 122 with VM2 132 and LS3 123 with VM3 133. Their deletion will not affect the routing domain of other logical switches. This is also applicable to the deletion of a logical switch port that connects with a VM, such as a port on LS1 121, LS2 122 or LS3 123.

Scenario D2 (see blocks 925 and 930 in FIG. 9): No routing domain ID update is performed when the deleted object type=logical switch that is directly connected with an SR. For example in FIG. 10, LS5 125 and LS6 126 are directly connected with TLR3-SR 116, and LS7 127 with PLR-SR 115. Their deletion will not affect the routing domain of other logical switches. This is also applicable to the deletion of a logical switch port that connects with an SR port on LS5 125, LS6 126 or LS7 127.

Scenario D3 (see blocks 925 and 930 in FIG. 9): No routing domain ID update is performed when the deleted object type=SR. For example in FIG. 10, the deletion of TLR3-SR 116 or PLR-SR 115 will not affect the routing domain of other logical switches. This is also applicable to the deletion of a port on the SR, such as a port on TLR3-SR 116 or PLR-SR 115.

Scenario D4 (see blocks 925, 935 and 940 in FIG. 9): Routing domain ID update is performed when the deleted object type is not one of the above. In this case, to identify one or more affected logical switches, a tree traversal is performed starting from the deleted logical object, from top to bottom in breadth-first search order. In a first example in FIG. 11, the deletion of TLR1-DR 111 triggers a tree traversal starting from TLR1-DR 111 (see 1110 in FIG. 11) to identify affected switch=LS1 121. In this case, since LS1 121 is no longer connected to any DR after the deletion, its routing domain ID is updated from [PLR-DR] to [NULL] (see 1120 in FIG. 11).

Figure 11:
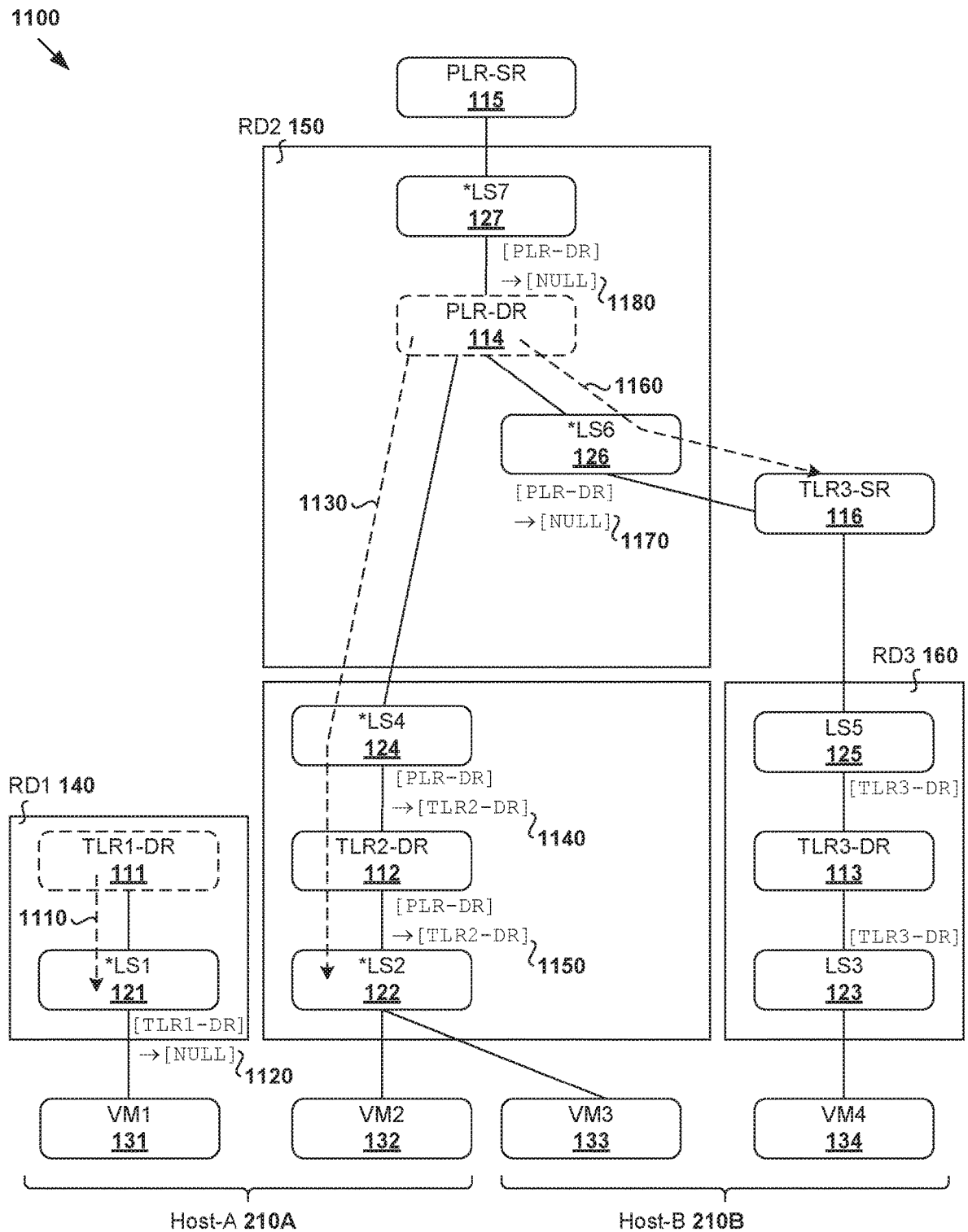
FIG. 11 is a schematic diagram illustrating second example delete operations in a logical network environment.

In a second example in FIG. 11, the deletion of PLR-DR 114 also triggers a tree traversal that starts from PLR-DR 114. A first branch is traversed (see 1130 in FIG. 11) to identify affected logical switches LS4 124 and LS2 122. Since they are only connected to TLR2-DR 112 after PLR-DR 114 is deleted, their routing domain ID is updated from [PLR-DR] to [TLR2-DR] (see 1140 and 1150 in FIG. 11). Another branch that connects PLR-DR 114 with LS6 126 and TLR3-SR 116 (see 1160 in FIG. 11) is traversed to identify LS6 126 as an affected logical switch. In this case, since LS6 126 is no longer connected to any DR after PLR-DR 114 is deleted, its routing domain ID is updated from [PLR-DR] to [NULL] (see 1170 in FIG. 11).

Note that the tree traversal from PLR-DR 114 via LS6 126 stops at TLR3-SR 116 because a routing domain does not encompass any SR, which means TLR3-SR 116 and its descendants (LS5 125 and LS3 123) will not be affected by the deletion. In the northbound direction, the routing domain ID of LS7 127 is also updated from [PLR-DR] to [NULL] (see 1180 in FIG. 11) after PLR-DR 114 is deleted.

(c) Update Operations

According to block 945 in FIG. 9, an operation to update a connection associated with a logical object may be detected. For example, the operation may create a new connection, or remove an existing connection, between a logical switch and a VM, SR or DR. Depending on the type of connection, it may or may not be necessary to perform routing domain reassignment.

According to some examples, a particular logical switch will not be affected by an operation to update a direct connection between the particular logical switch and a VM or an SR. If connected with a single DR, the particular logical switch will be affected by an operation to update its direct connection with that DR. If connected to multiple DRs, the particular logical switch and its descendant(s) will be affected by an operation to update a direct northbound connection from the particular logical switch to an upper-tier DR. If connected to multiple DRs, descendant(s) of the particular logical switch will be affected by an operation to update a direct southbound connection from the particular logical switch to a lower-tier DR.

Figure 12:
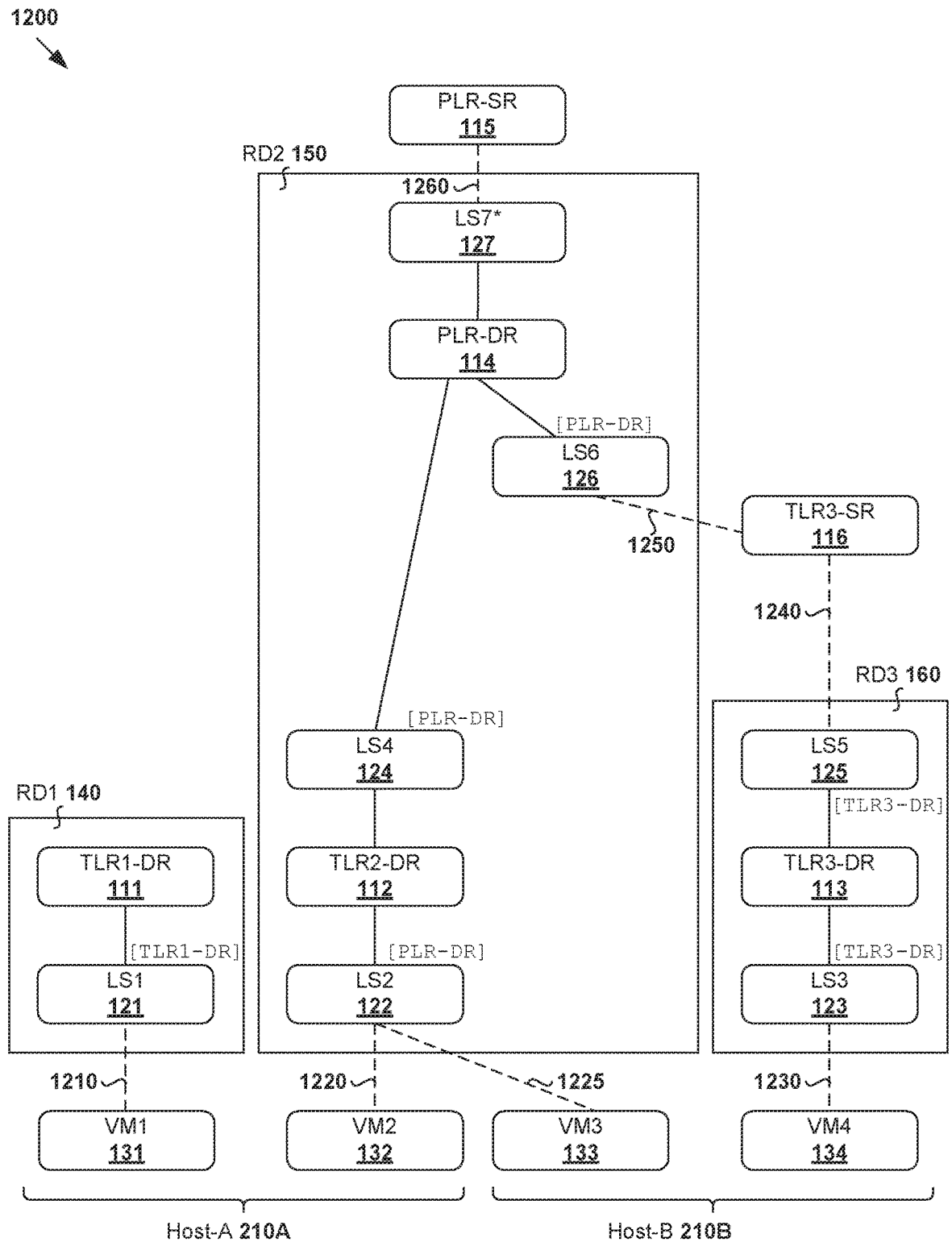
FIG. 12 is a schematic diagram illustrating first example update operations in a logical network environment.
Figure 13:
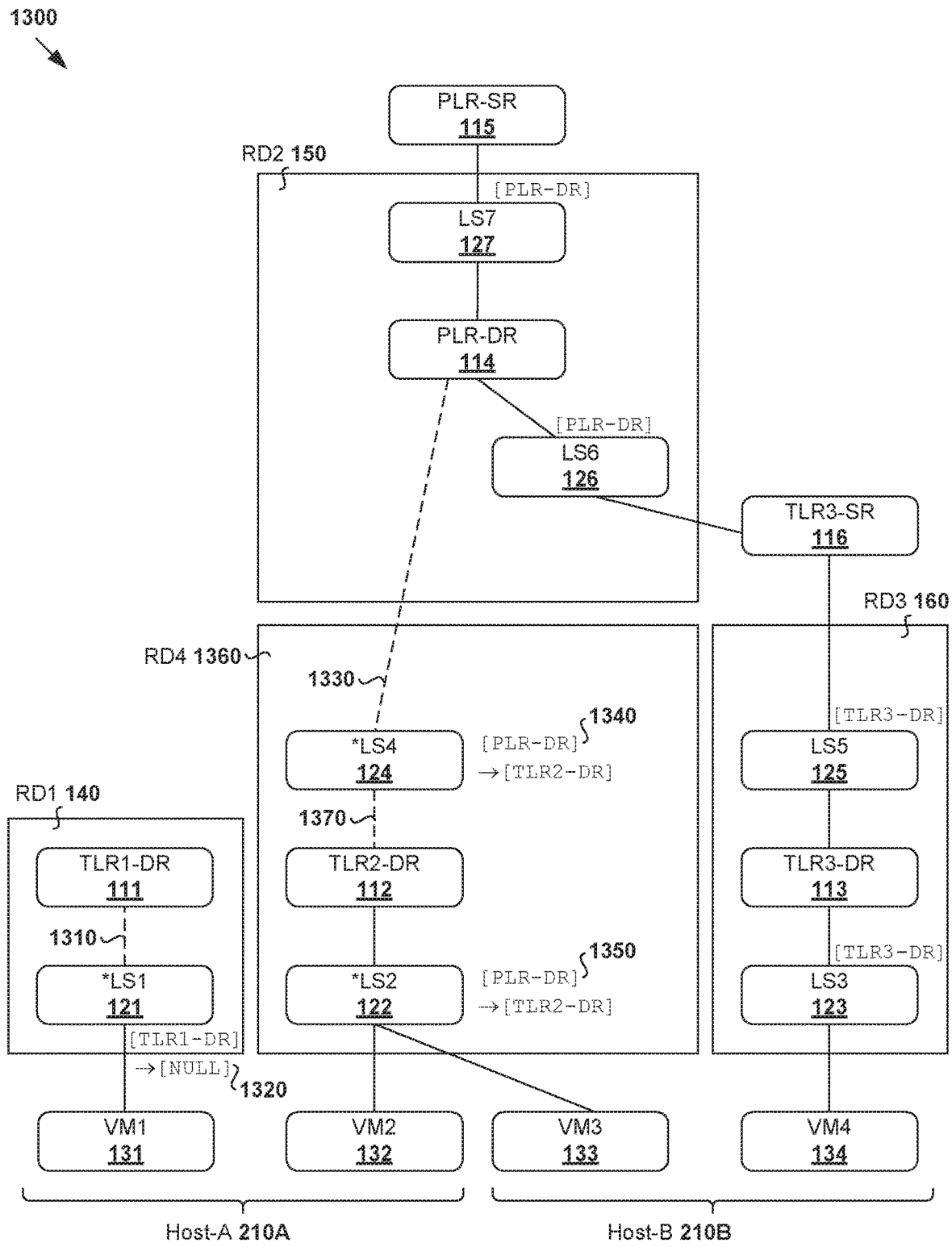
FIG. 13 is a schematic diagram illustrating second example update operations in a logical network environment.

Several scenarios are described below using FIG. 12 and FIG. 13. Two scenarios (labelled U1 and U2) will be explained using FIG. 12, which is a schematic diagram illustrating first example update operations in a logical network environment. Three other scenarios (labelled U3, U4 and U5) will be explained using FIG. 13, which is a schematic diagram illustrating second example update operations in a logical network environment.

Scenario U1 (blocks 950 and 955 in FIG. 9): No routing domain ID update is performed when there is an update to a direct connection between a logical switch and a VM. For example in FIG. 12, the following connections fall into this scenario: between LS1 121 and VM1 131 (see 1210), between LS2 122 and VM2 132 or VM3 133 (see 1220/1225), and between LS3 123 and VM3 133 (see 1230).

Scenario U2 (blocks 950 and 955 in FIG. 9): No routing domain ID update is performed when there is an update to a direct connection between a logical switch and an SR according to blocks 945, 950 and 955 in FIG. 9. For example in FIG. 12, the following connections fall into this scenario: between LS5 125 and TLR3-SR 116 (see 1240), between LS6 126 and TLR3-SR 116 (see 1250), and between LS7 127 and PLR-SR 115 (see 1260).

Scenario U3 (blocks 960 and 965 in FIG. 9): Routing domain ID update is performed when there is an update to a connection between a logical switch and a DR, where the logical switch is only connected to a single DR. For example in FIG. 13, LS1 121 is only connected to TLR1-DR 111. If the connection is deleted using an update operation (see 1310 in FIG. 13), LS1 121 is no longer connected to any DR. As such, its routing domain ID is updated from [PLR-DR] to [NULL] (see 1320 in FIG. 13).

Scenario U4 (blocks 970, 975 and 980 in FIG. 9): Routing domain ID update is also performed when there is an update to a direct northbound connection from a logical switch to a DR, where the logical switch is connected to multiple DRs. For example in FIG. 13, LS4 124 has a direct northbound connection with PLR-DR 114 (i.e., towards PLR-SR 115) and direct southbound connection with TLR2-DR 112 (i.e., towards VM2 132). If the northbound connection is deleted (see 1330 in FIG. 13), both LS4 124 and descendant=LS2 122 will be affected. Their routing domain ID is updated from [PLR-DR] to [TLR2-DR] (see 1340 and 1350 in FIG. 13) because LS4 124 and LS2 122 are only connected to TLR2-DR 112. This creates a fourth routing domain (see 1360 in FIG. 13) with ID=[TLR2-DR].

Scenario U5 (blocks 970 and 980 in FIG. 9): Routing domain ID update is also performed when there is an update to a direct southbound connection from a logical switch to a DR, where the logical switch is connected to multiple DRs. For example in FIG. 13, if the above southbound connection (LS4 124 to TLR2-DR 112) is deleted instead of the northbound connection (LS4 124 to PLR-DR 114), LS4 124 is not affected, but descendant=LS2 122 will be affected. Similarly, its routing domain ID will be updated from [PLR-DR] to [TLR2-DR] (see 1350 in FIG. 13).

Example process 900 in FIG. 9 is also applicable to an update that causes a logical switch port to connect with, or disconnect from, another logical object. In particular, scenario U1 is applicable to a connection between a logical switch port (e.g., on LS1 121) and a VM (e.g., VM1 131) in FIG. 12. Scenario U2 is applicable to a connection between a logical switch port (e.g., on LS5 125) and an SR port (e.g., on TLR3-SR 116) in FIG. 12. Further, scenario U3 is applicable to a connection between a logical switch port (e.g., on LS1 121) and a DR port (e.g., on TLR1-DR 111) in FIG. 13. Scenario U4 is applicable to a northbound connection between a logical switch port (e.g., on LS4 124) and a DR port (e.g., on PLR-DR 114) in FIG. 13. Similarly, scenario U5 is applicable to a southbound connection between a logical switch port (e.g., on LS4 124) and a DR port (e.g., on TLR2-DR 112) in FIG. 13.

Figure 10:
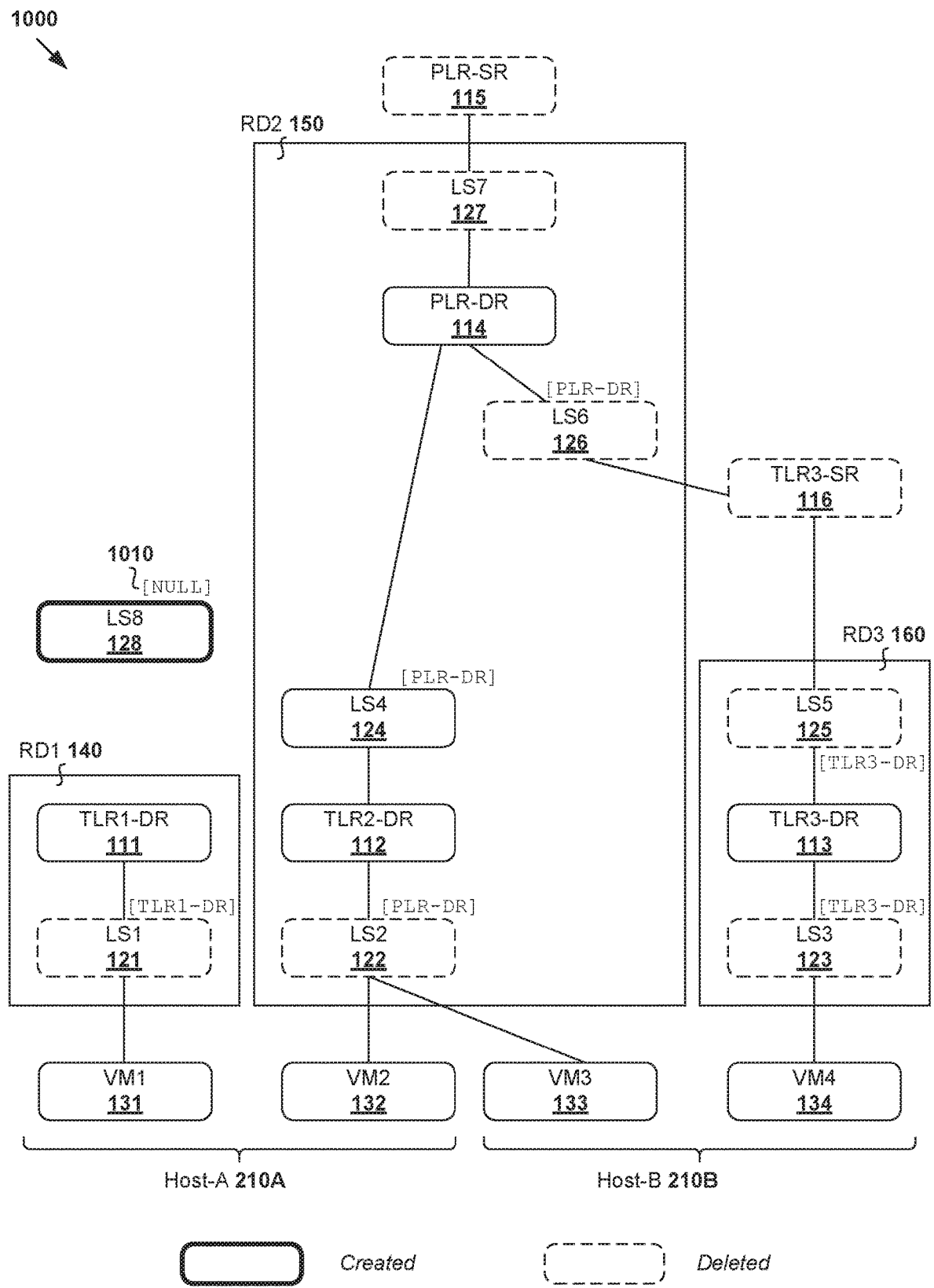
FIG. 10 is a schematic diagram illustrating first example create and delete operations in a logical network environment.
Figure 14:
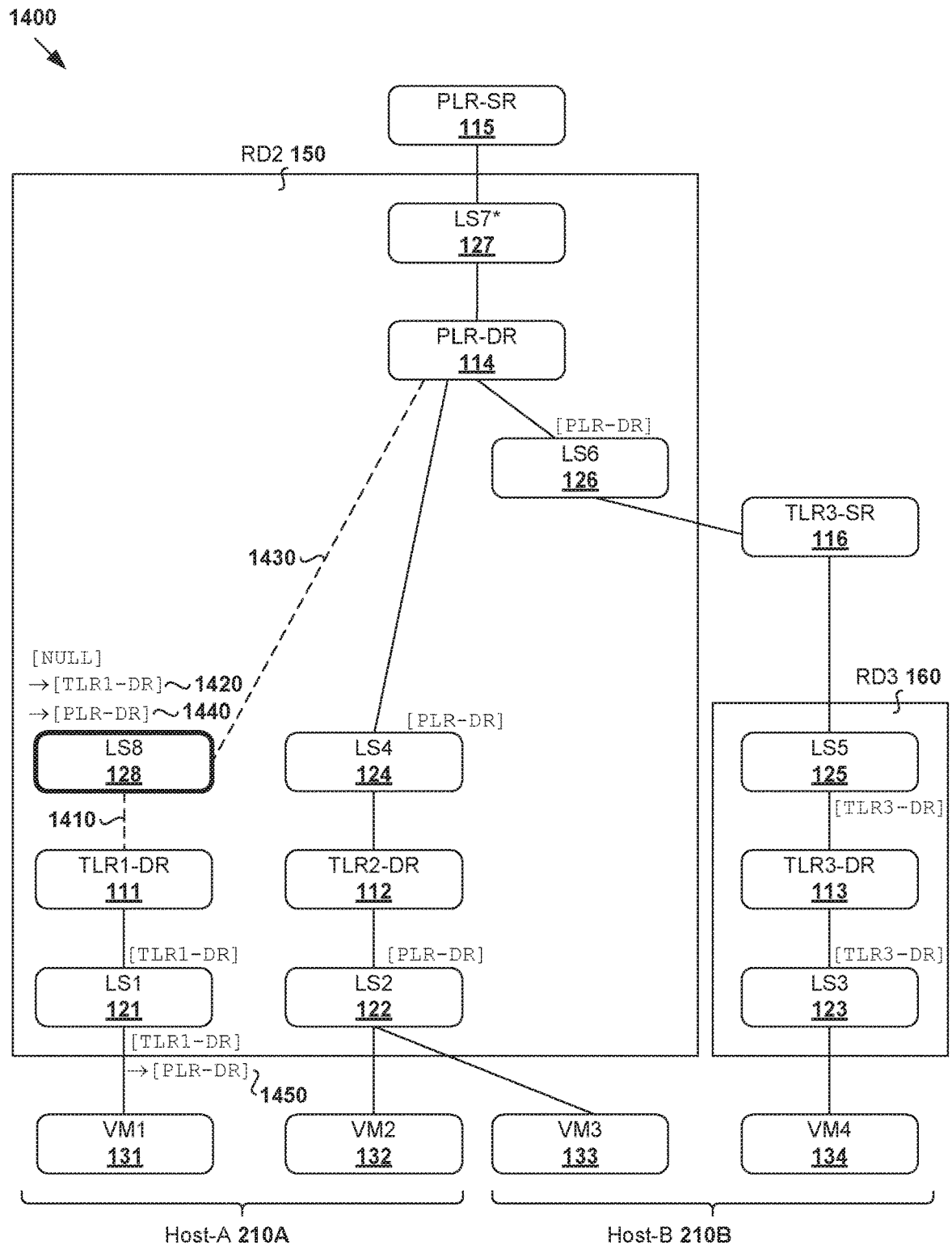
FIG. 14 is a schematic diagram illustrating third example update operations in a logical network environment.

Example process 900 in FIG. 9 is also applicable to operations to create new connections, such as when newly created LS8 128 in FIG. 10 is updated. In more detail, FIG. 14 is a schematic diagram illustrating third example update operations in a logical network environment. Here, scenario U3 is applicable when a new connection is created between LS8 128 and TLR1-DR 111 (see 1410 in FIG. 14). In this case, LS8 128 becomes connected to TLR1-DR 111, and its routing domain ID updated to [TLR1-DR] (see 1420 in FIG. 14).

Scenario U4 is applicable when a northbound connection is created from LS8 128 to PLR-DR 114 (see 1430 in FIG. 14). In this case, LS8 128 (now connected with TLR1-DR 111) and its descendant LS1 121 will be affected. Their routing domain ID is updated from [TLR1-DR] to [PLR-DR] (see 1440 and 1450 in FIG. 14). The scope of second routing domain with ID=[PLR=DR] is therefore expanded to further encompass LS8 128, TLR1-DR 111 and LS1 121.

Consistency

Figure 15:
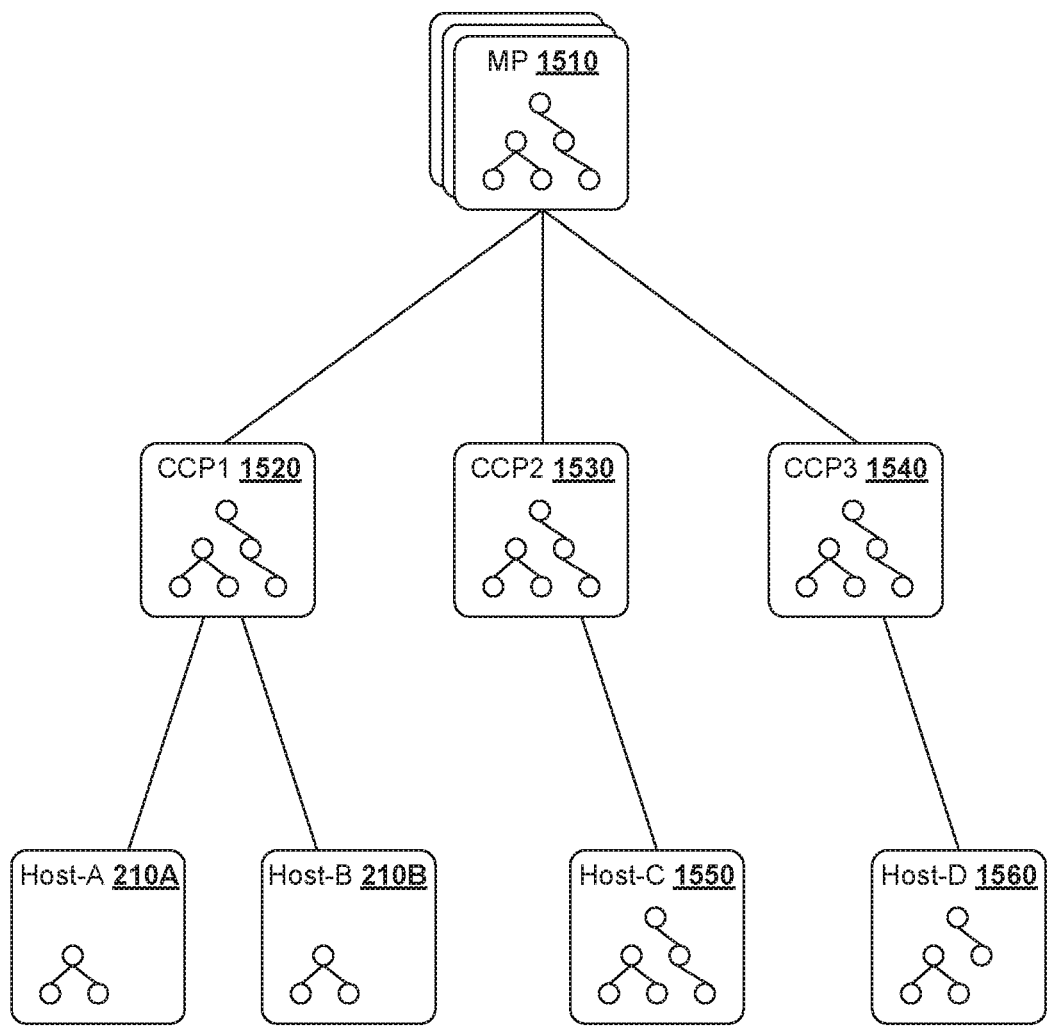
FIG. 15 is a schematic diagram illustrating an example logical network environment with cluster-based management plane and central control plane.

FIG. 15 is a schematic diagram illustrating example logical network environment 1500 with cluster-based management plane and central control plane. In the example in FIG. 15, management plane cluster 1510 that includes multiple management plane nodes (e.g., SDN managers 240), and manages a cluster of central control plane three nodes (e.g., SDN controllers 250) labelled CCP1 1520, CCP2 1530 and CCP3 1540. Here, management plane cluster 1510 may be configured to guarantee the consistency of network topology information among the central control plane nodes. For example, a full set of the network topology information may be provided to each central control plane node 1520/1530/1540.

Since there may be hundreds or thousands of hosts (as well as logical switches and logical routers connecting them), only a subset of the network topology information will be provided to host 210A/210B/1550/1560 to reduce their processing burden. For example, CCP1 1520 may send host-A 210A and host-B 210B a subset of network topology information received from management plane cluster 1510. Similarly, CCP2 1530 may send another subset to host-C 1550, while CCP3 1540 may send a further subset to host-D 1560. Since the management plane, central control plane and host 210A/210B/1550/1560 (i.e., data plane and local control plane) have access to the relevant network topology information, they should obtain the same results according to the examples in FIG. 1 to FIG. 14, regardless of where the assignment is performed.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical network interface controller(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 15. For example, the computer system may implement processes performed by an entity on the management plane (e.g., SDN manager 240), central control plane (e.g., SDN controller 250), local control plane (e.g., local control plane agent 215A/215B/215C at host 210A/210B/210C), data plane (e.g., a kernel module at host 210A/210B/210C), etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to assign a routing domain identifier in a logical network environment that includes one or more logical distributed routers and one or more logical switches, the method comprising:
obtaining network topology information specifying how the one or more logical distributed routers are connected with the one or more logical switches;
selecting, from the one or more logical switches, a particular logical switch for which routing domain identifier assignment is required, wherein the particular logical switch is distributed on multiple hosts in the logical network environment;

identifying, from the one or more logical distributed routers, a particular logical distributed router that is connected with the particular logical switch based on the network topology information, wherein the particular logical distributed router is distributed on the multiple hosts in the logical network environment;

assigning the particular logical switch with the routing domain identifier which is associated with a routing domain of the particular logical distributed router, wherein the routing domain identifier uniquely identifies the particular logical distributed router from one or more other logical distributed routers in the routing domain; and using the routing domain identifier in a communication between a management entity and each host, of the multiple hosts, that supports the particular logical switch and the particular logical distributed router.

2. The method of claim 1, wherein identifying the particular logical distributed router comprises:

determining that the particular logical switch is connected with a single logical distributed router, being the particular logical distributed router.

3. The method of claim 1, wherein identifying the particular logical distributed router comprises:

determining that the particular logical distributed router is an upper-tier logical distributed router, and the particular logical switch and the particular logical distributed router are either directly connected to each other, or indirectly connected via a lower-tier logical distributed router.

4. The method of claim 1, wherein identifying the particular logical distributed router comprises:

determining that the particular logical distributed router is a lower-tier logical distributed router, and the particular logical switch is directly connected to the particular logical distributed router and indirectly connected to an upper-tier logical distributed router via a logical service router.

5. The method of claim 1, wherein assigning the particular logical switch with the routing domain identifier comprises assigning the routing domain identifier to the particular logical switch according to rules that specify:

assigning the routing domain identifier associated with the routing domain of the particular logical distributed router to the particular logical switch, based on the particular logical switch being directly connected to a single logical distributed router that is the particular logical distributed router;

assigning the routing domain identifier associated with the routing domain of the particular logical distributed router to the particular logical switch, based on the particular logical switch being directly connected to an upper-tier logical distributed router that is the particular logical distributed router, or based on the particular logical switch being indirectly connected to the upper-tier logical distributed router via a lower-tier logical distributed router; and assigning the routing domain identifier associated with the routing domain of the particular logical distributed router to the particular logical switch, based on the particular logical switch being indirectly connected to an upper-tier logical distributed router via a logical service router and being directly connected to a lower-tier logical distributed router that is the particular logical distributed router.

6. The method of claim 1, further comprising:

detecting an operation that updates the network topology information;

determining whether the operation affects the particular logical switch, or one or more descendants associated with the particular logical switch, or both; and in response to determination in an affirmative, updating the routing domain identifier of the particular logical switch, or that of the one or more descendants, or both.

7. The method of claim 6, wherein determining whether the particular logical switch is affected comprises one of:

determining that the particular logical switch is not affected based on an operation to delete a logical object that is directly or indirectly connected to the particular logical switch, wherein the logical object is one of: another logical switch or a logical switch port that is directly connected to a virtualized computing instance; another logical switch or a logical switch port that is directly connected to a logical service router; or a logical service router and a port on the logical service router; and determining that the particular logical switch is affected based on the operation to delete the particular logical distributed router.

8. The method of claim 6, wherein determining whether the particular logical switch is affected comprises one of:

determining that the particular logical switch is not affected based on an operation to update a direct connection between the particular logical switch and a virtualized computing instance or a logical service router;

determining that the particular logical switch has a direct connection with a single logical distributed router, being the particular logical distributed router, and the particular logical switch is affected based on the operation to update the direct connection;

determining that the particular logical switch and one or more descendants are affected based on the operation to update a direct northbound connection from the particular logical switch to the particular logical distributed router; and determining that the particular logical switch is affected based on the operation to update a direct southbound connection from the particular logical switch to the particular logical distributed router.

9. A non-transitory computer-readable storage medium that includes a set of instructions which, in response to execution by a processor of a computer system, cause the processor to implement a method to assign a routing domain identifier in a logical network environment that includes one or more logical distributed routers and one or more logical switches, wherein the method comprises:

obtaining network topology information specifying how the one or more logical distributed routers are connected with the one or more logical switches;

selecting, from the one or more logical switches, a particular logical switch for which routing domain identifier assignment is required, wherein the particular logical switch is distributed on multiple hosts in the logical network environment;

identifying, from the one or more logical distributed routers, a particular logical distributed router that is connected with the particular logical switch based on the network topology information, wherein the particular logical distributed router is distributed on the multiple hosts in the logical network environment;

assigning the particular logical switch with the routing domain identifier which is associated with a routing domain of the particular logical distributed router, wherein the routing domain identifier uniquely identifies the particular logical distributed router from one or more other logical distributed routers in the routing domain; and using the routing domain identifier in a communication between a management entity and each host, of the multiple hosts, that supports the particular logical switch and the particular logical distributed router.

10. The non-transitory computer-readable storage medium of claim 9, wherein identifying the particular logical distributed router comprises:

determining that the particular logical switch is connected with a single logical distributed router, being the particular logical distributed router.

11. The non-transitory computer-readable storage medium of claim 9, wherein identifying the particular logical distributed router comprises:

determining that the particular logical distributed router is an upper-tier logical distributed router, and the particular logical switch and particular logical distributed router are either directly connected to each other, or indirectly connected via a lower-tier logical distributed router.

12. The non-transitory computer-readable storage medium of claim 9, wherein identifying the particular logical distributed router comprises:

determining that the particular logical distributed router is a lower-tier logical distributed router, and the particular logical switch is directly connected to the particular logical distributed router and indirectly connected to an upper-tier logical distributed router via a logical service router.

13. The non-transitory computer-readable storage medium of claim 9, wherein assigning the particular logical switch with the routing domain identifier comprises assigning the routing domain identifier to the particular logical switch according to rules that specify:

assigning the routing domain identifier associated with the routing domain of the particular logical distributed router to the particular logical switch, based on the particular logical switch being directly connected to a single logical distributed router that is the particular logical distributed router;

assigning the routing domain identifier associated with the routing domain of the particular logical distributed router to the particular logical switch, based on the particular logical switch being directly connected to an upper-tier logical distributed router that is the particular logical distributed router, or based on the particular logical switch being indirectly connected to the upper-tier logical distributed router via a lower-tier logical distributed router; and assigning the routing domain identifier associated with the routing domain of the particular logical distributed router to the particular logical switch, based on the particular logical switch being indirectly connected to an upper-tier logical distributed router via a logical service router and being directly connected to a lower-tier logical distributed router that is the particular logical distributed router.

14. The non-transitory computer-readable storage medium of claim 9, wherein the method further comprises:

detecting an operation that updates the network topology information;

determining whether the operation affects the particular logical switch, or one or more descendants associated with the particular logical switch, or both; and in response to determination in an affirmative, updating the routing domain identifier of the particular logical switch, or that of the one or more descendants, or both.

15. The non-transitory computer-readable storage medium of claim 14, wherein determining whether the particular logical switch is affected comprises one of:

determining that the particular logical switch is not affected based on an operation to delete a logical object that is directly or indirectly connected to the particular logical switch, wherein the logical object is one of: another logical switch or a logical switch port that is directly connected to a virtualized computing instance; another logical switch or a logical switch port that is directly connected to a logical service router; or a logical service router and a port on the logical service router; and determining that the particular logical switch is affected based on the operation to delete the particular logical distributed router.

16. The non-transitory computer-readable storage medium of claim 14, wherein determining whether the particular logical switch is affected comprises one of:

determining that the particular logical switch is not affected based on an operation to update a direct connection between the particular logical switch and a virtualized computing instance or a logical service router;

determining that the particular logical switch has a direct connection with a single logical distributed router, being the particular logical distributed router, and the particular logical switch is affected based on the operation to update the direct connection;

determining that the particular logical switch and one or more descendants are affected based on the operation to update a direct northbound connection from the particular logical switch to the particular logical distributed router; and determining that the particular logical switch is affected based on the operation to update a direct southbound connection from the particular logical switch to the particular logical distributed router.

17. A computer system configured to assign a routing domain identifier in a logical network environment that includes one or more logical distributed routers and one or more logical switches, the computer system comprising:

a processor; and a non-transitory computer-readable medium having stored thereon instructions that, in response to execution by the processor, cause the processor to:

obtain network topology information specifying how the one or more logical distributed routers are connected with the one or more logical switches;

select, from the one or more logical switches, a particular logical switch for which routing domain identifier assignment is required, wherein the particular logical switch is distributed on multiple hosts in the logical network environment;

identify, from the one or more logical distributed routers, a particular logical distributed router that is connected with the particular logical switch based on the network topology information, wherein the particular logical distributed router is distributed on the multiple hosts in the logical network environment;

assign the particular logical switch with the routing domain identifier which is associated with a routing domain of the particular logical distributed router, wherein the routing domain identifier uniquely identifies the particular logical distributed router from one or more other logical distributed routers in the routing domain; and use the routing domain identifier in a communication between a management entity and each host, of the multiple hosts, that supports the particular logical switch and the particular logical distributed router.

18. The computer system of claim 17, wherein the instructions to cause the processor to identify the particular logical distributed router cause the processor to:

determine that the particular logical switch is connected with a single logical distributed router, being the particular logical distributed router.

19. The computer system of claim 17, wherein the instructions to cause the processor to identify the particular logical distributed router cause the processor to:

determine that the particular logical distributed router is an upper-tier logical distributed router, and the particular logical switch and particular logical distributed router are either directly connected to each other, or indirectly connected via a lower-tier logical distributed router.

20. The computer system of claim 17, wherein the instructions to cause the processor to identify the particular logical distributed router cause the processor to:

determine that the particular logical distributed router is a lower-tier logical distributed router, and the particular logical switch is directly connected to the particular logical distributed router and indirectly connected to an upper-tier logical distributed router via a logical service router.

21. The computer system of claim 17, wherein the instructions to cause the processor to assign the particular logical switch with the routing domain identifier cause the processor to assign the routing domain identifier to the particular logical switch according to rules that specify:

assign the routing domain identifier associated with the routing domain of the particular logical distributed router to the particular logical switch, based on the particular logical switch being directly connected to a single logical distributed router that is the particular logical distributed router;

assign the routing domain identifier associated with the routing domain of the particular logical distributed router to the particular logical switch, based on the particular logical switch being directly connected to an upper-tier logical distributed router that is the particular logical distributed router, or based on the particular logical switch being indirectly connected to the upper-tier logical distributed router via a lower-tier logical distributed router; and assign the routing domain identifier associated with the routing domain of the particular logical distributed router to the particular logical switch, based on the particular logical switch being indirectly connected to an upper-tier logical distributed router via a logical service router and being directly connected to a lower-tier logical distributed router that is the particular logical distributed router.

22. The computer system of claim 17, wherein the instructions further cause the processor to:

detect an operation that updates the network topology information;

determine whether the operation affects the particular logical switch, or one or more descendants associated with the particular logical switch, or both; and in response to determination in an affirmative, update the routing domain identifier of the particular logical switch, or that of the one or more descendants, or both.

23. The computer system of claim 22, wherein the instructions to cause the processor to determine whether the particular logical switch is affected cause the processor to perform one of:

determine that the particular logical switch is not affected based on an operation to delete a logical object that is directly or indirectly connected to the particular logical switch, wherein the logical object is one of: another logical switch or a logical switch port that is directly connected to a virtualized computing instance; another logical switch or a logical switch port that is directly connected to a logical service router; or a logical service router and a port on the logical service router; and determine that the particular logical switch is affected based on the operation to delete the particular logical distributed router.

24. The computer system of claim 22, wherein the instructions to cause the processor to determine whether the particular logical switch is affected cause the processor to perform one of:

determine that the particular logical switch is not affected based on an operation to update a direct connection between the particular logical switch and a virtualized computing instance or a logical service router;

determine that the particular logical switch has a direct connection with a single logical distributed router, being the particular logical distributed router, and the particular logical switch is affected based on the operation to update the direct connection;

determine that the particular logical switch and one or more descendants are affected based on the operation to update a direct northbound connection from the particular logical switch to the particular logical distributed router; and determine that the particular logical switch is affected based on the operation to update a direct southbound connection from the particular logical switch to the particular logical distributed router.

* * * * *